United States Patent
Yakuwa et al.

(10) Patent No.: US 10,067,816 B2
(45) Date of Patent: Sep. 4, 2018

(54) MODEL CHECKING APPARATUS AND METHOD, AND STORAGE MEDIUM HAVING PROGRAM STORED THEREIN

(71) Applicant: NEC Corporation, Minato-ku, Tokyo (JP)

(72) Inventors: Yutaka Yakuwa, Tokyo (JP); Nobuyuki Tomizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 167 days.

(21) Appl. No.: 15/300,370

(22) PCT Filed: Apr. 16, 2015

(86) PCT No.: PCT/JP2015/002098
§ 371 (c)(1),
(2) Date: Sep. 29, 2016

(87) PCT Pub. No.: WO2015/159551
PCT Pub. Date: Oct. 22, 2015

(65) Prior Publication Data
US 2017/0147419 A1    May 25, 2017

(30) Foreign Application Priority Data
Apr. 18, 2014   (JP) .................................. 2014-086643

(51) Int. Cl.
*G06F 11/25*   (2006.01)
*G06F 11/07*   (2006.01)

(52) U.S. Cl.
CPC ........ *G06F 11/079* (2013.01); *G06F 11/0709* (2013.01)

(58) Field of Classification Search
CPC . G06F 11/0709; G06F 11/0751; G06F 11/079
(Continued)

(56) References Cited

U.S. PATENT DOCUMENTS

| 8,176,496 B2 | 5/2012 | Wang et al. |
| 2006/0248515 A1 | 11/2006 | Qadeer et al. |
| 2009/0089783 A1 | 4/2009 | Wang et al. |

FOREIGN PATENT DOCUMENTS

JP   2009-087356 A   4/2009

OTHER PUBLICATIONS

Canini, M. et al., "A Nice Way to Test OpenFlow Applications", Proc. of NSDI, 2012.
(Continued)

*Primary Examiner* — Chae M Ko

(57) ABSTRACT

In a model check with respect to a distributed environment model, in order to reduce redundant search, wasteful search is avoided and efficient search is enabled. A model checking apparatus is provided with: a distributed environment model search unit that, when searching a distributed environment model by model checking, performs the search while determining whether execution with respect to a predetermined transition should be postponed; a distributed environment model dependency relationship analysis unit that analyzes a dependency relationship and a happens-before relationship with respect to a plurality of transitions on a path searched by the distributed environment model search unit, and that generates information about a back track with respect to the path; and a delay transition information providing unit that, on the basis of the information, generates information about the predetermined transition of which execution should be postponed in the search performed, after a back track, by the distributed environment model search unit.

10 Claims, 22 Drawing Sheets

(58) Field of Classification Search
 USPC .................................................... 714/37, 39
 See application file for complete search history.

(56) References Cited

OTHER PUBLICATIONS

McKeown, N. et al., "OpenFlow: enabling innovation in campus networks", ACM SIGCOMM Computer Communication Review, vol. 38, No. 2, pp. 69-74, 2008.
"OpenFlow Switch Specification Version 1.0.0 (Wire Protocol 0x01)," 2009. <Internet search> http://www.openflow.org/documents/openflow-spec-v1.0.0.pdf.
Flanagan, C. et al., "Dynamic partial-order reduction for model checking software", Proc. of POPL '05, pp. 110-121, 2005.
Yang, Y. et al., "Efficient Stateful Dynamic Partial Order Reduction", Proc. of SPIN '08, pp. 288-305, 2008.
Yabandeh, M. et al., "DPOR-DS: Dynamic Partial Order Reduction in Distributed Systems", EPFL Technical Report NSL-Report-2009-005, 2009.
Yutaka, Yakuwa, Nobuyuki Tomizawa, Toshio Tonouchi, "Model Checking of OpenFlow Network with Abstraction of Packets Based on Symbolic Execution", IEICE Technical Report, IN2013-54 (Jul. 2013), Jul. 11, 2013, vol. 113, No. 140, pp. 107-112.
International Search Report for PCT Application No. PCT/JP2015/002098, dated Jun. 30, 2015.
English translation of Written opinion for PCT Application No. PCT/JP2015/002098.

MODEL CHECKING APPARATUS AND METHOD, AND STORAGE MEDIUM HAVING PROGRAM STORED THEREIN

This application is a National Stage Entry of PCT/JP2015/002098 filed on Apr. 16, 2015, which claims priority from Japanese Patent Application 2014-086643 filed on Apr. 18, 2014, the contents of all of which are incorporated herein by reference, in their entirety.

TECHNICAL FIELD

The present invention relates to a model checking apparatus, a model checking method, and a storage medium having a program stored therein.

BACKGROUND ART

A system and software have recently become more complex and gigantic. As a means for solving the issue, for example, a verification technique by model checking is known. Model checking models a verification target as a state transition system. Then the modeled state transition system is, for example, exhaustively searched. Consequently, for example, whether or not the verification target satisfies a specification is verified. Model checking can be applied from a system design stage. Whether or not the verification target satisfies a specification can also be guaranteed and verified. Accordingly, model checking is attracting attention as a technology for improving reliability of a system and software.

Application of model checking to network verification is also being attempted recently. For example, NPL 1 discloses a system testing, by model checking, a network controlled by OpenFlow. As disclosed in NPL 2 and 3, in OpenFlow, a switch (OpenFlow switch: OFS) performs processing, on the basis of a flow entry set by a controller (OpenFlow controller: OFC). The flow entry specifies, for example, a condition of matching with a predetermined field in a packet header, a rule specifying an operation in the checking, statistical information, and the like. When a flow entry matching with header information in a received packet does not exist with respect to the received packet, the switch, for example, transmits a packet-in message to the controller and requests calculation of a flow. Then, the controller derives a flow, on the basis of a network topology and the like, and sets a flow entry relating to the flow to the switch on the flow.

In NPL 1, when a state search on an OpenFlow network is executed, symbolic execution of an OpenFlow controller program is performed, a set of representative values of packets for executing all code paths is obtained, and a state search is executed by use of the set. An overview of model checking disclosed in NPL 1 will be described in accordance with the description in NPL 1. A system state is assumed to be a combination of component states, and a transition represents a change from one state to another state, such as message transmission. In each state, each component retains a set of feasible transitions. When searching a given state space model, a model checker first initializes a state stack, and subsequently repeats following processing until the state stack becomes empty. The checker selects, from the stack, one state and a transition that is possible in the one state, and tests, for example, a correctness property with respect to a new state newly reached after executing the transition. When the new state does not violate the correctness property, the model checker adds the new state to a searched state set, and schedules execution of all transitions considered feasible in the state. In NPL 1, a program of OpenFlow controller is configured as a set of event handlers, a program state is taken as a value of a global variable, and each event handler is handled as a transition. In order to execute a transition, a corresponding event handler is activated. For example, reception of a packet-in message from the switch enables a packet-in transition, and the model checker executes the transition by activating an event handler corresponding to the transition. Symbolic execution is performed in consideration of an operation of an event handler being data-dependent.

While model checking provides a merit as described above, an amount of memory and time required for calculation increases exponentially with a scale of a verification target. Accordingly, enhanced searching efficiency is essential in model checking aiming at practical verification of a system and software.

For example, NPL 4 discloses dynamic partial order reduction (DPOR) being a technology of pruning a redundant search in view of verification, in model checking with respect to a multi-threaded environment model.

DPOR in a case of searching a state transition system being a model-checking target (such as depth-first-search) is as follows.

(A) Executing an appropriate path first.
(B) Confirming next whether or not there is a pair of transitions, a mutual execution order of which influences an execution result, in a transition sequence of the path. Such a pair of transition is referred to as "transitions in a dependency relation."
(C) Searching, when the transitions in a dependency relation exist in pairs of transition, for a state immediately before the transition executed earlier of the pair, from the previously executed path, in order to search a path in which an execution order of the transitions in the pair is reversed. Generating next a backtrack point from which a search is started, on the basis of a place where a transition different from the previously executed path (transition different from the transition executed earlier of the pair) is executed from the state (state immediately before the transition executed earlier).
(D) After detecting all transitions in a dependency relation from the previously executed path, resuming the search from the rearmost (at the deepest position) backtrack point on the previously executed path.
(E) Repeating the procedure, (B) to (D) described above, until a backtrack point no longer exists.

Thus, out of all execution patterns of the verification target, only paths having different execution results can be searched. In other words, a search of paths not having a different verification results, that is, redundant paths in view of verification, can be pruned, and enhanced searching efficiency can be provided.

NPL 5 discloses stateful dynamic partial ordering reduction (SDPOR) being a technology improving DPOR. In model checking, in general, when a state searched in the past (searched state) is reached again, a search subsequent to the state is naturally redundant, and therefore the search is discontinued. However, in DPOR, when a search is easily discontinued, analysis of transitions in a dependency relation on an execution path is influenced, and a correct result is not obtained. Accordingly, even when reaching a searched state, DPOR does not discontinue a search and continues the search. SDPOR is improved DPOR, being capable of discontinuing a search when reaching a searched state. SDPOR manages a transition executed in a past search with a graph, and utilizes the graph for analysis of a dependency relation.

In the graph, a transition is associated with each node, and each directed edge represents an execution order of transitions executed in a past search.

For example, assuming that a state immediately after a transition t1 executed during the search is s1, when a transition t2 is further executed from s1, a directed edge is drawn in the graph from a node n1 corresponding to the transition t1 to a node n2 corresponding to the transition t2. When reaching a state $S_2$ being searched in the past, SDPOR, in which the nodes n1 and n2 are created when not existent in the graph, checks for a transition executable from the state $S_2$. Additionally, SDPOR searches for a node corresponding to the transition in the graph, and extracts every reachable node by tracing directed edges from the node. A transition corresponding to the previously extracted node represents a transition that may be executed in a state transition after $S_2$. By use of these transitions and a transition on the current execution path, SDPOR analyzes a dependency relation and generates a backtrack point. A merit of SDPOR is, even when a search after a searched state is discontinued, a dependency relation can be correctly analyzed by the procedures, and provides enhanced efficiency can be provided by the discontinuation of the search.

NPL 6 discloses dynamic partial ordering reduction in distributed systems (DPOR-DS) being a technology modifying DPOR, being designed for a multi-threaded system, for model checking of a distributed system. In order to absorb an environmental difference between models being verification targets, DPOR-DS changes a generation method of a backtrack point. With regard to a relation between transitions on an execution path, DPOR-DS defines a happens-before relation in a distributed-environment model aside from a dependency relation, and utilizes the happens-before relation in determination of backtrack point generation. The happens-before relation is an execution-order relation between transitions, always holding on a model. For example, considering transitions transmitting and receiving a packet p, the transition transmitting the packet p always occurs before the transition receiving the packet p. Such an order relation between transitions always holding on the basis of a causal relation on a model is the happens-before relation (refer to NPL 6).

DPOR-DS analyzes existence or nonexistence of a happens-before relation with respect to a transition on an execution path, in addition to a dependency relation. Even in a case that a dependency relation exists between transitions, when a happens-before relation holds, DPOR-DS does not generate a backtrack point. Further, when resuming a search from a backtrack point, out of transitions executed between a pair of two transitions in a dependency relation (denoting the transition executed earlier by t1 and the transition executed later by t2), DPOR-DS successively executes transitions in a happens-before relation with the transition t2, and the transition t2, at the beginning of the resumed search.

With reference to FIG. 1, the above will be described by use of a specific example. It is assumed that transitions ta, tb, tc, and td are executed in this order in a first search. It is further assumed that, as a result of analysis of a dependency relation and a happens-before relation, the following are found:

a dependency relation exists between ta and td, and a happens-before relation exists between tc and td (tc is always executed before td).

Then, DPOR-DS generates a backtrack point b1 at a state S0 immediately before executing the transition ta.

Then, when resuming the search from the backtrack point b1, DPOR-DS first executes:

tc (the transition in a happens-before relation with the transition [td] executed later of a pair of transitions [ta and td] in a dependency relation, out of the transitions [tb and tc] executed between the pair), and td (the transition executed later of the pair of transitions in a dependency relation).

Subsequently, there is no specified order of transition, and an appropriate path is executed. Specifically, in the example in FIG. 1, the transitions are executed in an order of, for example, tc, td, ta, and tb from the backtrack point b1. Among the transitions, the first two transitions tc and td constitute a part in which an execution order is specified by a search algorithm of DPOR-DS, as described above. The remaining transitions ta and tb constitute a part in which an execution order is appropriately determined. An order of the pair of transitions in a dependency relation (ta and td) is reversed here. The setting of the order in the first part (tc and td) at the backtrack point is a mechanism aiming at reduction of a redundant search.

With reference to FIG. 2, a situation without the mechanism will be described by use of a specific example. In the example in FIG. 1, in a case that the search is resumed by backtracking, when only one transition (only tc) to be executed first is specified, the transitions may be executed in an order of, for example, tc, ta, tb, and td from the backtrack point b1, as illustrated in FIG. 2.

The backtracking in FIG. 1 aims at execution of a search with a reversed order of ta and td in a dependency relation, while, in the example in FIG. 2, the order of ta and td in a dependency relation is not reversed in the backtracking.

As illustrated in FIG. 2, DPOR-DS analyzes a dependency relation with respect to the path of tc, ta, tb, and td again, and generates a backtrack point b2 at a state s5 immediately before executing the transition ta. Consequently, the transitions are executed in an order of tc, td, ta, and tb in a next search, and a search of a path with transitions generated in a desired order can be provided. However, the second search (search of the path tc, ta, tb, and td) is redundant from the viewpoint of verification and is wasteful from the viewpoint of efficiency. In order to reduce the redundant search, DPOR-DS provides a mechanism of specifying a first transition sequence (the transition sequence tc and td from the backtrack point b1 in the example in FIG. 1) upon resumption of a search by backtracking, to reduce a search of a redundant path (the path tc, ta, tb, and td in the example in FIG. 2). A merit of DPOR-DS is that a search can be pruned in model checking of a distributed-environment model as well, by the procedures.

CITATION LIST

Non Patent Literature

[NPL 1] Canini, M. et al. "A NICE Way to Test OpenFlow Applications," Proc. of NSDI, 2012.

[NPL 2] McKeown, N. et al. "OpenFlow: enabling innovation in campus networks," ACM SIGCOMM Computer Communication Review, Vol. 38, No. 2, pp. 69-74, 2008.

[NPL 3] "OpenFlow Switch Specification Version 1.0.0 (Wire Protocol 0x01)," 2009. <Internet search> http://www.openflow.org/documents/openflow-spec-v1.0.0.pdf

[NPL 4] Flanagan, C. et al. "Dynamic partial-order reduction for model checking software," Proc. of POPL '05, pp. 110-121, 2005.

[NPL 5] Yang, Y. et al. "Efficient Stateful Dynamic Partial Order Reduction," Proc. of SPIN '08, pp. 288-305, 2008.

[NPL 6] Yabandeh, M. et al. "DPOR-DS: Dynamic Partial Order Reduction in Distributed Systems," EPFL Technical Report NSL-REPORT-2009-005, 2009.

SUMMARY OF INVENTION

Technical Problem

The following provides analysis of the related art.

A problem in NPL 6 is that, in the mechanism of reducing a redundant search by specifying a first transition sequence upon resumption of a search by the aforementioned backtracking, the first transition sequence is not always executable, and a wasteful search may occur (the present inventor's view). With reference to FIG. 3, the above will be described by use of a specific example.

First, it is assumed that a path p1, being an appropriate path in which transitions ta, tb, tc, and td are executed in this order, is searched.

Then, it is further assumed that the following are found:
dependency relations exist between ta and td, and between
  tb and tc, respectively, and
a happens-before relation exists between tc and td (tc is
  always executed before td).

Next, DPOR-DS generates a backtrack point b1 at which the transitions tc and td are first executed in this order, at a state S0 immediately before executing the transition ta, in accordance with the aforementioned method. Similarly, DPOR-DS generates a backtrack point b2 at which tc is first executed, at a state $S_1$ immediately before executing the transition tb. In other words, with regard to a pair of the two transitions (tb and tc) in a dependency relation, the backtrack point b2, at which a transition (none) in a happens-before relation with the transition tc executed later of the pair, out of the transitions executed between tb and tc, and the transition tc executed later are first executed, is generated.

As generation of the backtrack points is completed, the search is next resumed from the rearmost backtrack point on the path (execution path) p1 on which the search is executed. The backtrack point b2 at the state immediately before executing the transition tb is rearmost, and therefore DPOR-DS first executes the transition tc from the backtrack point b2, and subsequently executes a transition appropriately. In this case, tb is executed subsequent to tc. It is assumed that, consequently, a search (second search) of a path p2 of ta, tc, tb, and te as a whole is executed.

In the path p2, the transition te not executed in the path p1 in the first search is executed. The reason is that, as a result of reversing the execution order of tb and tc in a dependency relation, the transition content of tc is changed, the transition td executed after tc in the path p1 in the first search is no longer executed, and te is executed instead.

Next, it is assumed that, as a result of analysis of a dependency relation and a happens-before relation in the path p2 in the second search, the following are found:
dependency relations exist between tc and tb, and between
  ta and te, respectively, and
a happens-before relation exists between tc and te.

Then, a backtrack point is generated, while backtracking is already done with respect to the dependency relation between tc and tb. Accordingly, a backtrack point is not generated again. Consequently, a backtrack point b3 at which the transitions tc and te are first executed in this order, is generated at a state S0 immediately before executing ta. In other words, with regard to a pair of the two transitions (ta and te) in a dependency relation, the backtrack point b3 at which a transition (tc) in a happens-before relation with the transition te executed later of the pair, out of the transitions executed between ta and te, and the transition te are first executed, is generated.

Similar to the above, as generation of the backtrack point b3 is completed, the search is next resumed from the rearmost backtrack point on the execution path. There are two rearmost backtrack points, b1 and b3. The point generated earlier, b1, is selected and backtracking is executed.

Then, execution of the transitions tc and td in this order is attempted. However, while tc can be executed, td cannot be executed. The reason is that, as described above, when tc is executed before tb, a transition that can be subsequently executed is not td but te.

Accordingly, the search of the transitions tc and td attempted from the backtrack point b1 is not executable in the first place, and results in a wasteful search.

As described above, DPOR-DS specifies a first transition sequence upon resumption of the search by backtracking as a mechanism for reducing a redundant search. However, a problem is confirmed that the first transition sequence is not always executable, and may generate a wasteful search.

An object of the present invention is to provide an apparatus, a program, and a method, avoiding a wasteful search and enabling an efficient search, in solving the aforementioned problem and reducing a redundant search.

Solution to Problem

In order to achieve the object described above, according to one aspect of the present invention, the provided is a distributed-environment-model checking apparatus, comprising:

a distributed-environment-model search unit that, when searching a distributed-environment model by model checking, executes the search while determining whether or not to postpone execution with respect to a predetermined transition;

a distributed-environment-model-dependency-relation analysis unit that analyzes a dependency relation and a happens-before relation with regard to a plurality of transitions on a path searched by the distributed-environment-model search unit, and generates information about backtracking with respect to the path; and a delayed-transition-information providing unit that generates information about the predetermined transition, execution of which is to be postponed in the search after backtracking executed by the distributed-environment-model search unit, based on the information generated by the distributed-environment-model-dependency-relation analysis unit and the analysis result.

According to another aspect of the present invention, the provided is a distributed-environment-model checking method, comprising:

when searching a distributed-environment model by model checking, executing the search while determining whether or not to postpone execution with respect to a predetermined transition;

analyzing a dependency relation and a happens-before relation with regard to a plurality of transitions on the searched path, and generating information about backtracking with respect to the path; and generating information about the predetermined transition, execution of which is to be postponed in searching the distributed-environment model after backtracking, based on at least the generated information.

According to yet another aspect of the present invention, the provided is a program causing a computer to execute:

distributed-environment-model search processing of, when searching a distributed-environment model by model checking, executing the search while determining whether or not to postpone execution with respect to a predetermined transition;

distributed-environment-model-dependency-relation analysis processing of analyzing a dependency relation and a happens-before relation with regard to a plurality of transitions on a path searched by the distributed-environment-model search processing, and generating information about backtracking with respect to the path; and delayed-transition-information providing processing of generating information about the predetermined transition, execution of which is to be postponed in the search after backtracking executed by the distributed-environment-model search means, based on at least information generated by the distributed-environment-model-dependency-relation analysis processing.

A non-transitory storage medium such as a computer-readable semiconductor memory and a magnetic/optical disk, recording the program, according to yet another aspect of the present invention, is provided.

Advantageous Effects of Invention

The present invention is able to provide an efficient search without generating a wasteful search, in reducing a redundant search in model checking.

DESCRIPTION OF EMBODIMENTS

Figure 22:
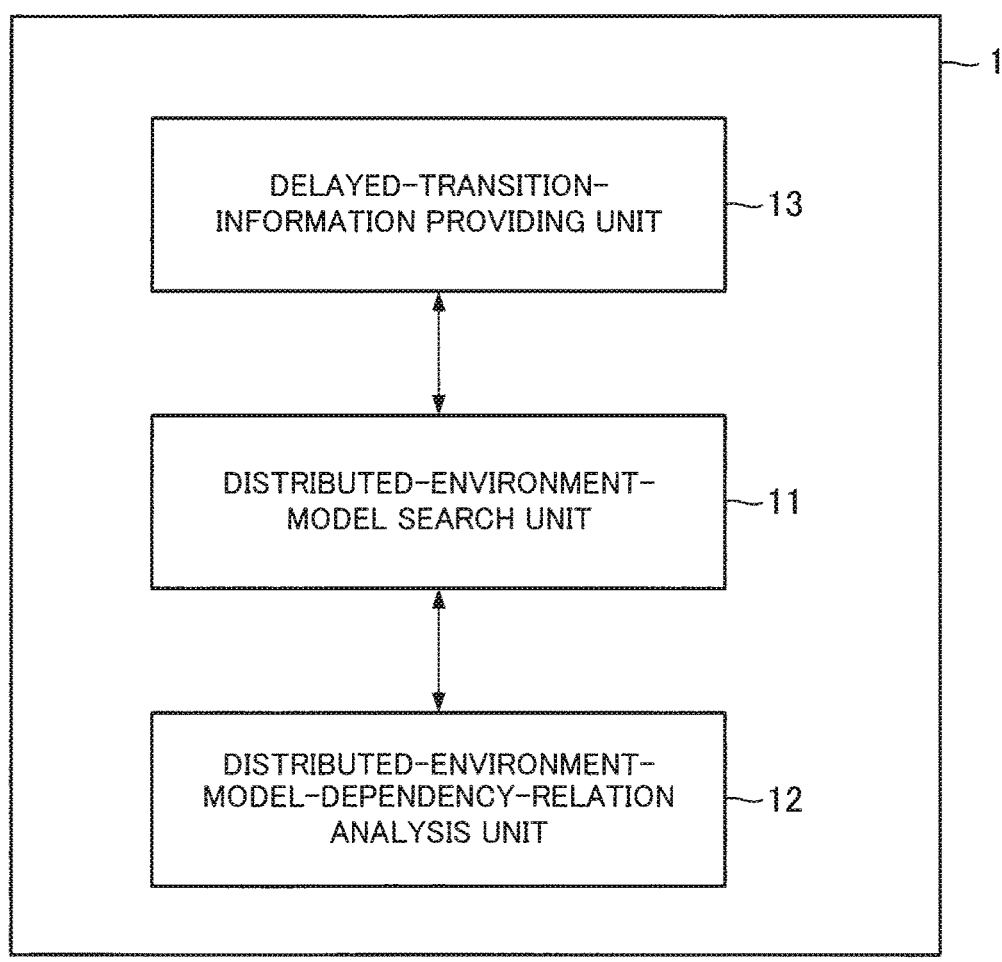
FIG. 22 is a diagram illustrating a basic concept of the present invention.

A basic exemplary embodiment of the present invention will be described below. With reference to FIG. 22, an apparatus according to the basic exemplary embodiment of the present invention includes a distributed-environment-model search unit (unit is hereinafter also referred to as step, processing, or means) 11, a distributed-environment-model-dependency-relation analysis unit 12, and a delayed-transition-information providing unit 13. When searching a distributed-environment model by model checking, the distributed-environment-model search unit 11 executes the search while determining whether or not to postpone execution with respect to a predetermined transition. The distributed-environment-model-dependency-relation analysis unit 12 analyzes a dependency relation and a happens-before relation with respect to a plurality of transitions on a path searched by the distributed-environment-model search unit 11, and generates information about backtracking with respect to the path. The delayed-transition-information providing unit 13 generates information about the predetermined transition, execution of which is to be postponed in a subsequent search (search after backtracking) of the distributed-environment model executed by the distributed-environment-model search unit 11, on the basis of at least the information generated by the distributed-environment-model-dependency-relation analysis unit 12. A method and a program according to the basic exemplary embodiment of the present invention are expressed by reading the respective units 11 to 13 in FIG. 22 as steps and processing. An operation of the apparatus according to the basic exemplary embodiment of the present invention can be provided using hardware, by mounting a circuit part being a hardware part such as a large scale integration (LSI). Alternatively, the operation may be provided using software, by storing a program providing functions of the apparatus in an unillustrated software storage medium, loading the program into a main memory unit, and executing the program on a CPU. The respective units will be described in detail below.

The distributed-environment-model search unit 11 causes a transition of a state of the distributed-environment model being a model-checking target to execute a search, generates an execution path, and transfers the path to the distributed-environment-model-dependency-relation analysis unit 12. The distributed-environment-model-dependency-relation analysis unit 12 analyzes a dependency relation and a happens-before relation on an execution path, generates a backtrack point on a searched path, and returns the path to the distributed-environment-model search unit 11. The distributed-environment-model search unit 11 specifies backtracking on the path transferred from the distributed-environment-model-dependency-relation analysis unit 12, and provides a path with a change for the delayed-transition-information providing unit 13, and the delayed-transition-information providing unit 13 analyzes the path and returns information about a transition, execution of which is to be postponed in a subsequent search (search in backtracking) by the distributed-environment-model search unit 11, to the distributed-environment-model search unit 11, and the distributed-environment-model search unit 11 postpones a transition, execution of which is to be postponed, in a search in backtracking, on the basis of setting from the delayed-transition-information providing unit 13 and searches the distributed-environment model.

The basic exemplary embodiment of the present invention specifies a transition, execution of which is to be postponed in a search, upon resumption of the search by backtracking in the model checking, instead of specifying a transition sequence to be first executed, as is the case with DPOR-DS.

Figure 3:
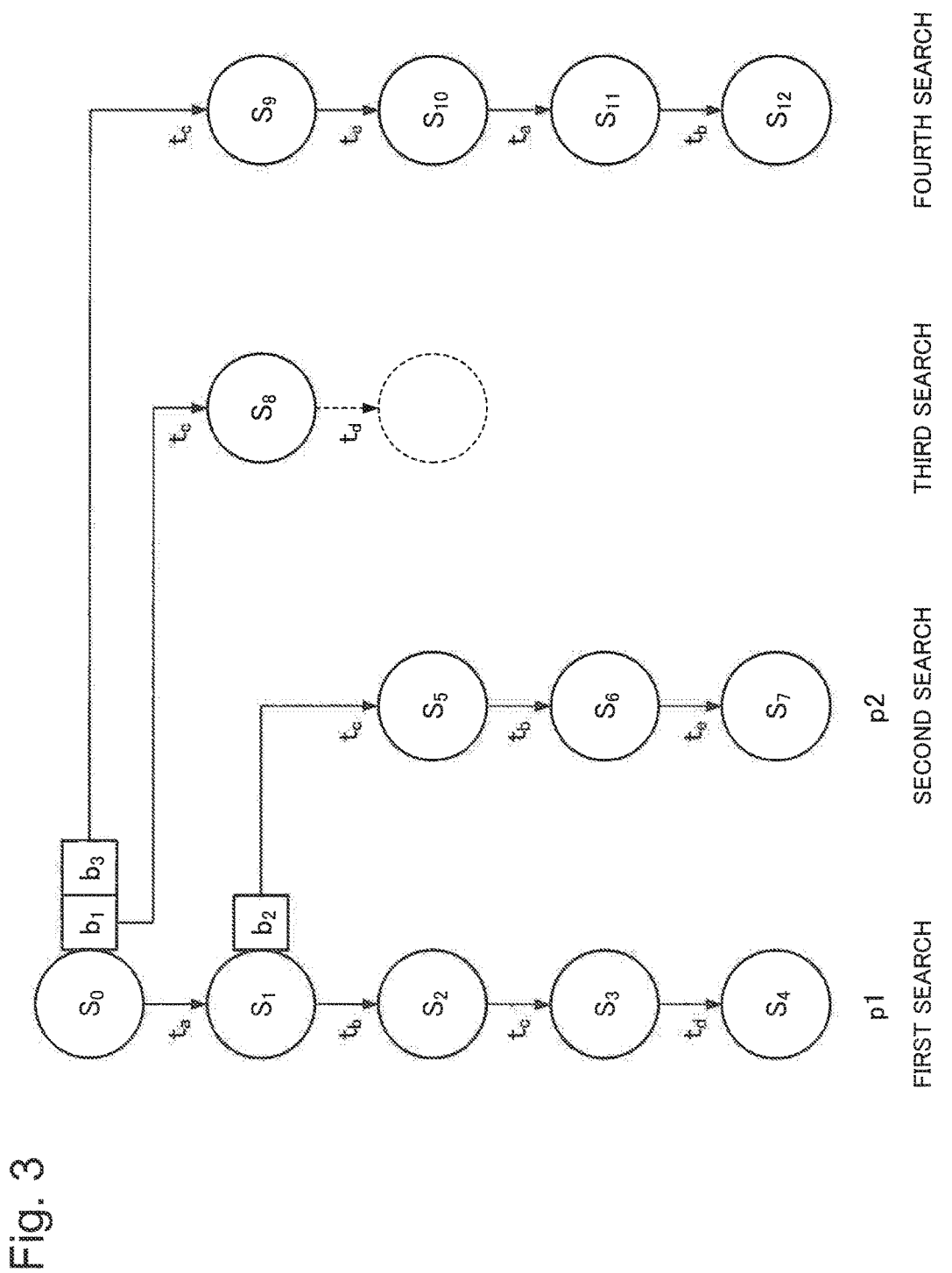
FIG. 3 is a diagram illustrating the related art.

Both DROP-DS and the basic exemplary embodiment of the present invention are able to reverse an execution order of a pair of transitions in a dependency relation detected in a previous search, in a search after backtracking. However, in the DPOR-DS method, as described with reference to FIG. 3, a wasteful search attempting to execute an inexecutable transition may occur.

Figure 21:
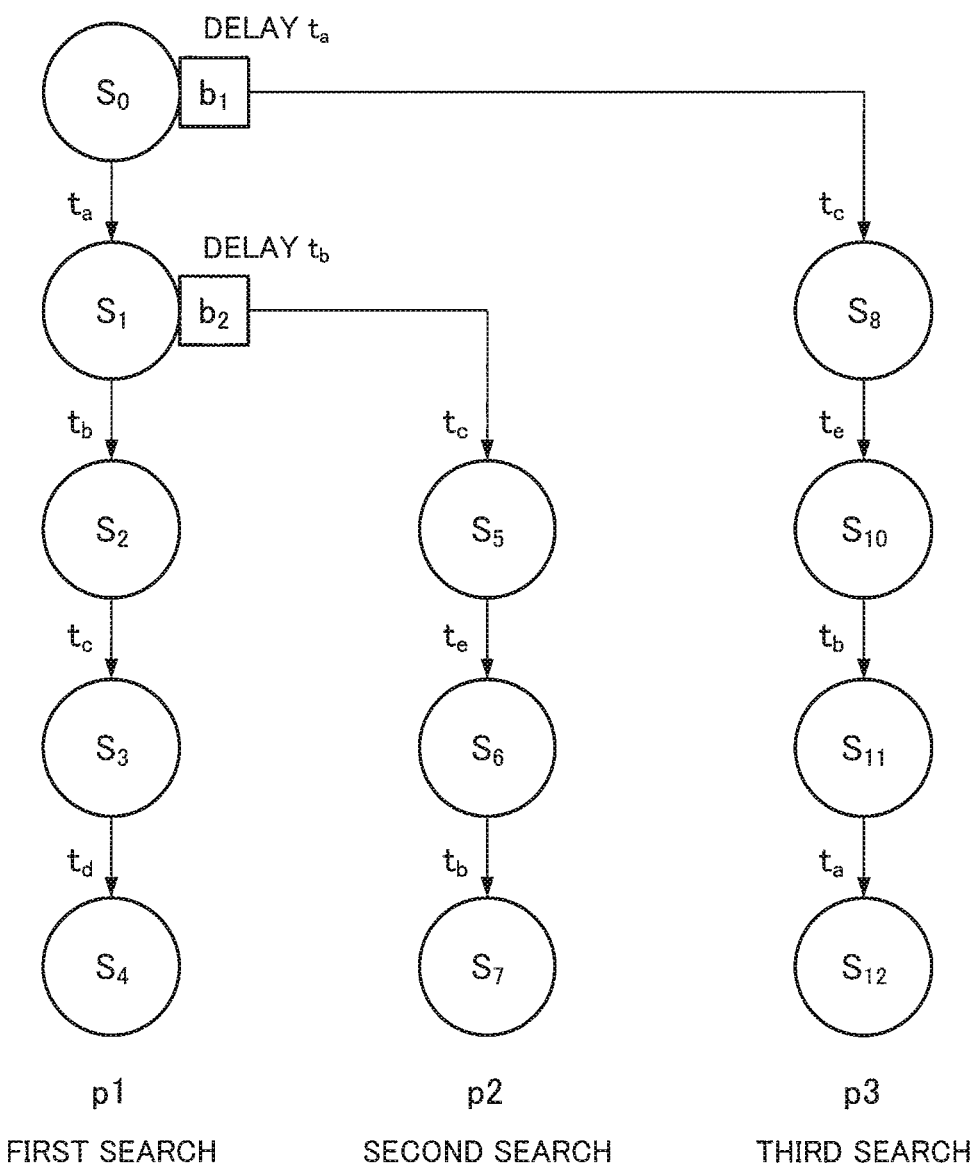
FIG. 21 is a diagram illustrating an example of an operating principle of the present invention.

By contrast, the basic exemplary embodiment of the present invention postpones a transition executed earlier of a pair of transitions in a dependency relation detected in a previous search, in a search after backtracking. With reference to FIG. 21, an operating principle according to the basic exemplary embodiment of the present invention will be described in detail.

It is assumed that a path p1 in which transitions ta, tb, tc, and td are executed in this order is first searched as an appropriate path. Then, it is further assumed that the following are found:
dependency relations exist between ta and td, and between tb and tc, and
a happens-before relation exists between tc and td (tc is always executed before td).

Next, the basic exemplary embodiment generates a backtrack point b1 at a state S0 immediately before executing ta. Upon resumption of the search from the backtrack point b1, the basic exemplary embodiment first executes tc (the transition in a happens-before relation with the transition [td] executed later of a pair of the two transitions [ta and td] in a dependency relation, out of transitions [tb and tc] executed between the pair of the transitions [ta and td]). In addition, when the search is resumed from the state S0, execution of ta (the transition executed earlier of the pair of the two transitions [ta and td] in a dependency relation, detected in the previous search) is postponed in the search.

By a similar method, the basic exemplary embodiment generates a backtrack point b2 at which tc is executed first, at a state $S_1$ immediately before executing the transition tb. In the search resuming from the state $S_1$, execution of tb (the transition executed earlier of a pair of the two transitions [tb and tc] in a dependency relation detected in the previous search) is postponed.

As generation of the backtrack points is completed, the search is next resumed from the rearmost backtrack point on the execution path. The backtrack point b2 at the state $S_1$ immediately before executing tb is rearmost, and therefore the basic exemplary embodiment first executes the transition tc from the backtrack point b2, and subsequently executes a transition appropriately. However, execution of the transition tb alone is postponed. It is assumed that, consequently, a path p2 of ta, tc, te, and tb as a whole is executed. The reason for a transition te not executed in the first path p1 being executed is that, as a result of reversing the execution order of tb and tc in a dependency relation, the transition content of tc is changed, td executed after tc in the first path p1 is no longer executed, and te is executed instead.

Next, it is assumed that, analysis of a dependency relation and a happens-before relation is performed in the second search path p2, and the following are found:
dependency relations exist between tc and tb, and between ta and te, respectively, and
a happens-before relation exists between tc and te.

Then, a backtrack point is generated. However, backtracking is already done with respect to the dependency relation between tc and tb, and therefore a backtrack point is not generated again.

Creation of a backtrack point b3 first executing the transition tc from the state S0 is attempted on the basis of the analysis result of the dependency relation between ta and te, in accordance with the aforementioned method. However, in this case, the backtrack point b1 with the same content is already generated, and therefore a new backtrack point is not generated.

As generation of backtrack points is completed, the search is next resumed from the rearmost backtrack point on the execution path. The backtrack point b1 at the state S0 immediately before executing ta is rearmost. The basic exemplary embodiment first executes the transition tc from the backtrack point b1, and subsequently executes a transition appropriately. However, execution of ta alone is postponed. Consequently, a path p3 of tc, te, tb, and ta as a whole is executed.

Thus, the basic exemplary embodiment of the present invention executes a search while postponing transitions in a dependency relation. Accordingly, in contrast to DPOR-DS, a wasteful search attempting to execute an unexecuted transition (td in the third search in FIG. 3 as a specific example) is not executed.

Figure 1:
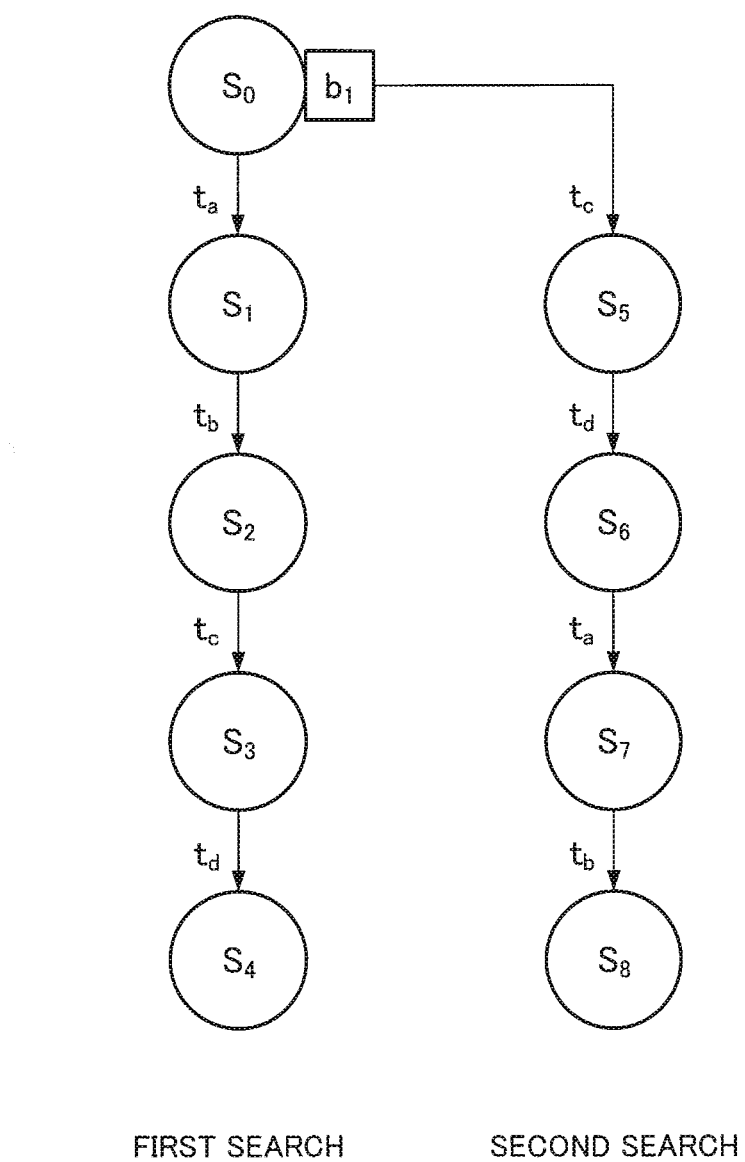
FIG. 1 is a diagram illustrating a related art.
Figure 2:
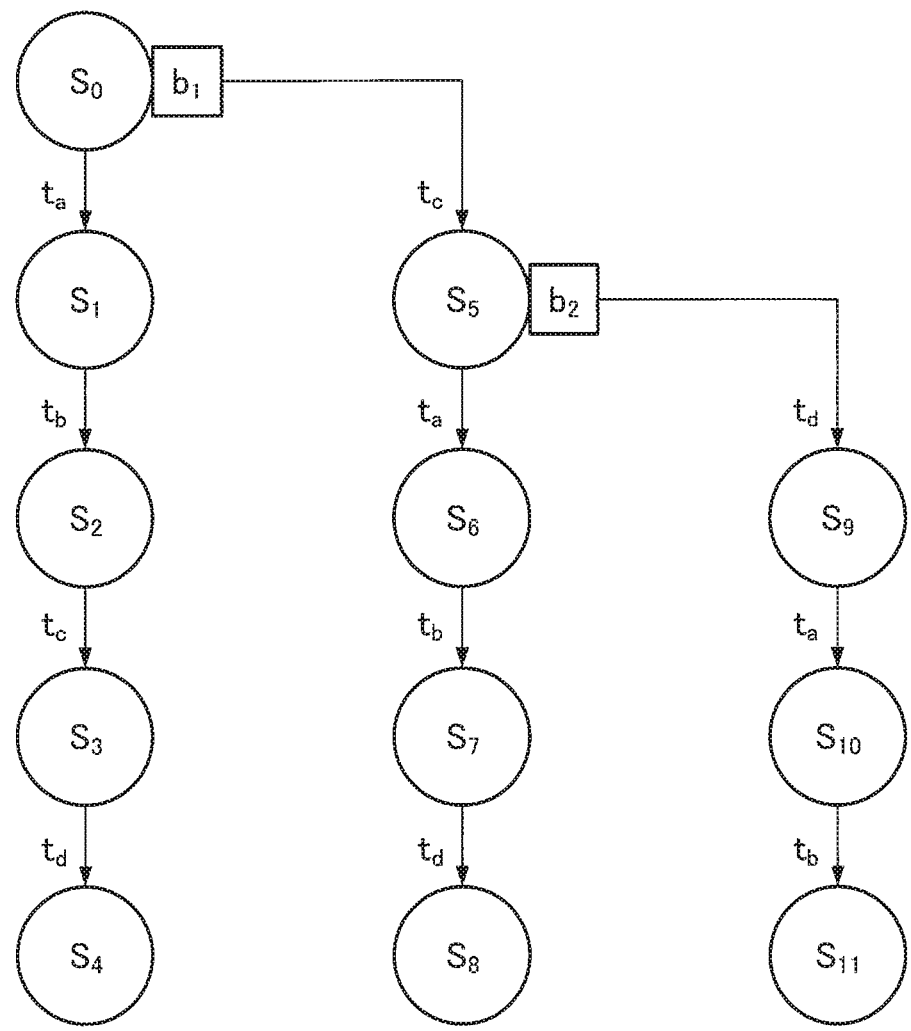
FIG. 2 is a diagram illustrating the related art.

In contrast to DPOR, the basic exemplary embodiment of the present invention does not execute a wasteful search in which an order of transitions in a dependency relation is not reversed (the search of the path of tc, ta, tb, and td in the second search in FIG. 2 as a specific example). Consequently, the basic exemplary embodiment of the present invention is able to provide enhanced efficiency in model checking.

As described above, even when there is a transition, a content of which is changed in a search after backtracking from a previous search, the basic exemplary embodiment of the present invention simply postpones execution of a specific transition. While DPOR-DS may generate a wasteful search attempting to execute an inexecutable transition, the basic exemplary embodiment of the present invention does not generate such a wasteful search.

Consequently, the basic exemplary embodiment of the present invention is able to provide enhanced searching efficiency in model checking.

When DPOR is applied to model checking of a distributed-environment model, the basic exemplary embodiment of the present invention is able to reduce a redundant search without generating a wasteful search, and enhance searching efficiency. The following exemplary embodiments will be described on the basis of examples applying the basic exemplary embodiment of the present invention to model checking of a distributed environment.

First Exemplary Embodiment

Figure 4:
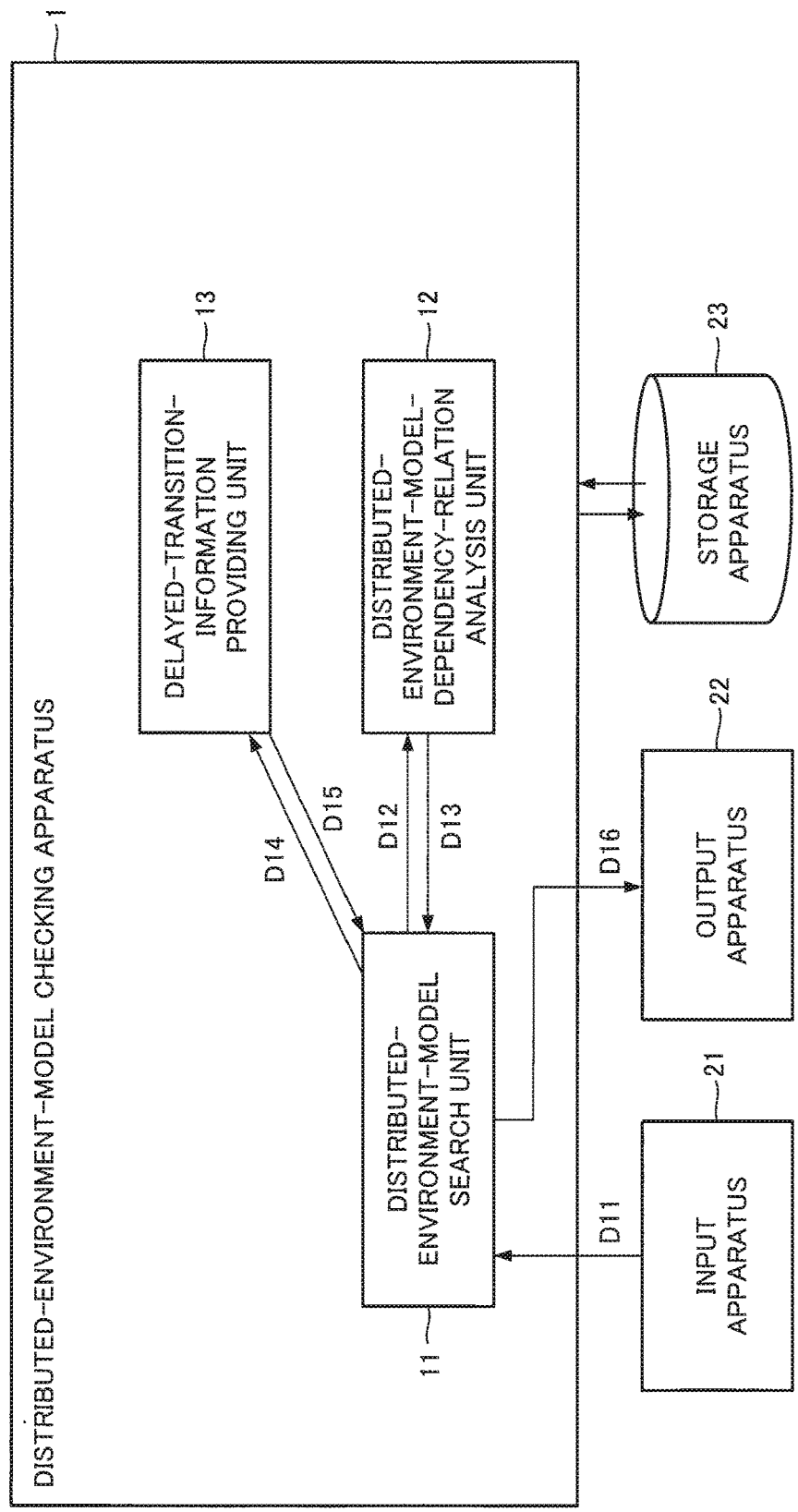
FIG. 4 is a diagram illustrating a configuration according to a first exemplary embodiment of the present invention.

FIG. 4 is a diagram exemplifying a configuration according to a first exemplary embodiment of the present invention. With reference to FIG. 4, the configuration according to the first exemplary embodiment of the present invention will be described in detail. With reference to FIG. 4, a distributed-environment-model checking apparatus 1 according to the first exemplary embodiment of the present invention includes a distributed-environment-model search unit 11, a distributed-environment-model-dependency-relation analysis unit 12, a delayed-transition-information providing unit 13, an input apparatus 21, an output apparatus 22, and a storage apparatus 23. Among the units, the distributed-environment-model search unit 11, the distributed-environment-model-dependency-relation analysis unit 12, and the delayed-transition-information providing unit 13 correspond to the components in FIG. 22, respectively. The distributed-environment-model search unit 11, the distributed-environment-model-dependency-relation analysis unit 12, and the delayed-transition-information providing unit 13 may provide processing and functions by a program executed on a computer.

The distributed-environment-model search unit 11 receives, from a user through the input apparatus 21, verification information D11 including:
a distributed-environment model (description of state space); and
a property to be satisfied by the distributed-environment model.
Model checking (state search) is executed by use of the verification information D11. The distributed-environment-model search unit 11 returns verification result D16 including whether or not the property is satisfied, and, when the property is not satisfied, a counterexample indicating such a result, to the user through the output apparatus 22.

A specification of a distributed-environment model (description of state space of a distributed system) has only to be a state transition system capable of properly defining a dependency relation and a happens-before relation, to be described later, and allowing for mechanical analysis of the relations, and is not limited to a specific specification. A description format (description format of state space) of the distributed-environment model has only to be mechanically processable by the distributed-environment-model search unit 11 (for example, reading, analysis, and search execution of the distributed-environment model by a data processing apparatus such as a computer and a central processing unit [CPU]), and is not limited to a specific format.

It is assumed that a specification of the distributed-environment model according to the first exemplary embodiment is described as follows.

A state of the distributed-environment model according to the first exemplary embodiment is defined, for example, as follows (however, the state is not herein limited to the below).

A state is defined as a tuple of three sets (N, M, Q).

N is a set of nodes being operating entities in the distributed environment. A component n of N (n∈N) has a variable sv representing a state thereof.

M is a set of messages exchanged between nodes. A component m of M (m∈M) has a variable my representing a content of a message.

Q is a set of communication channels. A component q of Q (q∈Q) is a communication channel provided by a variable storing a plurality of messages.

It is assumed that a node is able to take a message from a communication channel independently of an order of storage of messages in the communication channel. Each node has communication channels for communication with another node, one for transmission and another for reception, with respect to each communicable node. A transmitting communication channel for one node is a receiving communication channel for another node and vice versa.

A definition of a transition in the distributed-environment model according to the first exemplary embodiment will be described.

It is assumed that a transition represents a situation of change in a state of the distributed-environment model by any of the nodes existing in the model executing an operation of a specific unit. The operation of a specific unit specifically includes, for example, following three types.
1. Message transmission by a node
2. Message reception by a node
3. Internal operation of a node
Each of the three types of operations will be described in detail below.

First, a transition by message transmission by a node will be described. A node is able to execute a message transmission operation, according to an own state sv. In a transition by message transmission by a node, a node n generates a message m, stores the message m in a message-transmitting communication channel (=a receiving communication channel for a node other than the node n) of the node n, and changes (may not change) a content of the state sv of the node n.

Next, a transition by message reception by a node will be described. When one or more messages are stored in an own message-receiving communication channel, a node is able to execute a message reception operation. In a transition by message reception by a node, an arbitrary message m is taken from a message-receiving communication channel q, in a node n, storing one or more messages. Then a content of a state sv of the node n is changed (may not be changed), according to a content my of the message m.

Next, a transition by an internal operation of a node will be described. A node is able to execute an internal operation, on the basis of an own state sv. In a transition by an internal operation of a node, a node n changes (may not change) a content of the own state sv.

When causing a state transition, the distributed-environment-model search unit 11 confirms whether or not a property included in verification information D11, in a state after the transition, is satisfied, in addition to the aforementioned operations (1, 2, and 3) of the model. When the property is not satisfied, the distributed-environment-model search unit 11 ends the model checking processing on the spot, and returns a verification result D16 including a result that the verification property is not satisfied and a counterexample being a specific example indicating such a result, to the user through the output apparatus 22.

A property is not necessarily required to be included in verification information D11. When a property is not defined, a typical property is to be verified, and the entire distributed-environment-model checking apparatus 1 thereafter operates as if the typical property is included in the verification information D11.

The distributed-environment-model-dependency-relation analysis unit 12 receives an execution path D12 executed in the distributed-environment-model search unit 11 from the distributed-environment-model search unit 11.

The distributed-environment-model-dependency-relation analysis unit 12 analyzes a dependency relation and a happens-before relation between two transitions on the execution path D12.

The distributed-environment-model-dependency-relation analysis unit 12 generates backtrack points on the execution path D12. The distributed-environment-model-dependency-relation analysis unit 12 returns the result D13 (an execution path on which the backtrack points are generated) to the distributed-environment-model search unit 11.

A dependency relation is a relation holding between two transitions. For example, when changing an execution order of two transitions in a state transition system changes a result after execution of the transitions, or when executing one of the two transitions influences executability of the other transition, it is referred to as a dependency relation holding between the two transitions (the transitions having a dependency relation).

A condition that a dependency relation "does not hold" between transitions t1 and t2 is generally defined, for example, as follows.

1. In a case that the transition t1 is executable in a state $S_1$ and the state $S_1$ transitions to a state $S_2$ by the transition t1, the transition t2 is executable in both of the states $S_1$ and $S_2$, or inexecutable in both of the states.
2. In a case that the transition t1 and t2 are executable in a state $S_1$, when a destination state of the transition t2 executed in a destination state of the transition t1 executed in the state $S_1$ is $S_2$, a destination state of the transition t1 executed in a destination state of the transition t2 executed in the state $S_1$ is also $S_2$.

However, analyzing whether or not the aforementioned general dependency relation holds involves a high cost. Accordingly, the first exemplary embodiment of the present invention defines a dependency relation as follows, in consideration of the specification of the distributed-environment model used and the DPOR algorithm.

A node operating in the transition t1 and a node operating in the transition t2 are a same node, and a content of a state sv of the node is changed in either transition.

A happens-before relation is an execution-order relation between transitions always holding on a model. For example, considering transitions transmitting and receiving a message m in the distributed-environment model according to the first exemplary embodiment, a transition t1 transmitting the message m always occurs before a transition t2 receiving the message m.

Such an execution-order relation between transitions always holding on the basis of a causal relation on a model is referred to as a happens-before relation, and is described as t1→t2.

The first exemplary embodiment of the present invention defines a happens-before relation as follows, in consideration of the specification of the distributed-environment model used and the DPOR algorithm.

1. When a transition t1 is a transition by message transmission by a node, a transition t2 is a transition by message reception by a node, and a message transmitted in the transition t1 and a message received in the transition t2 are a same message, then t1→t2.
2. When t1→t2 and t2→t3, then t1→t3.

Next, a data structure of the execution path D12 will be described.

The execution path D12 is an array (or an equivalent data structure) having a 6-tuple (=execution-path components) of (st, tr, Backtrack, Done, Delay, Dependency) as components.

st represents a state of the distributed-environment model at a certain point.

tr represents a transition executed from the state st.

Backtrack represents a set of transitions to be executed from the state st upon backtracking, in backtracking in a search by model checking.

Done represents a set of transitions executed from the state st in past searches.

Delay represents a set of transitions, execution of which is to be postponed in a search after the state st (=delayed transitions).

A difference set obtained by subtracting Done from Backtrack represents a set of transitions to be executed by backtracking from the state st but not yet executed.

Dependency is a hash table (or an equivalent data structure) storing a transition confirmed to have a dependency relation by the distributed-environment-model-dependency-relation analysis unit 12. A key is a transition, and a value is a set of transitions in a dependency relation with the transition.

Adding a transition tr2 to a transition set tr_set that can be acquired by use of Dependency with a transition tr1 as a key, is herein expressed as "registering tr2 with Dependency with tr1 as a key." When there is no value that can be acquired by use of Dependency with tr1 as a key, {tr2} (a set having tr2 as a component) is set as a value corresponding to the key tr1.

The execution path D13 is made so as to have a similar data structure to the execution path D12.

Next, a data structure of a transition will be described. A transition is expressed by a tuple composed of five components (node, type, send, recv, change_flag).

node represents a node operating in the transition.

type represents a type of the transition (a value representing any one of message transmission by a node, message reception by a node, and an internal operation of a node).

send represents a message transmitted in the transition.

recv represents a message received in the transition.

change_flag represents a flag indicating whether or not a state sv of a node is changed in the transition. change_flag stores true when the state sv is changed, and false when not changed.

When a state transitions in a search by the distributed-environment-model search unit 11, transition data based on the data structure are generated after a value in each field is properly set, according to a content of the transition.

When receiving an execution path D14 from the distributed-environment-model search unit 11, the delayed-transition-information providing unit 13 provides information about a transition, execution of which is to be postponed in a subsequent search executed by the distributed-environment-model search unit 11, for the execution path D14. The unit returns the result (execution path D15) to the distributed-environment-model search unit 11. Data structures of the execution paths D14 and D15 are similar to the data structure of the aforementioned execution path D12.

Figure 5:
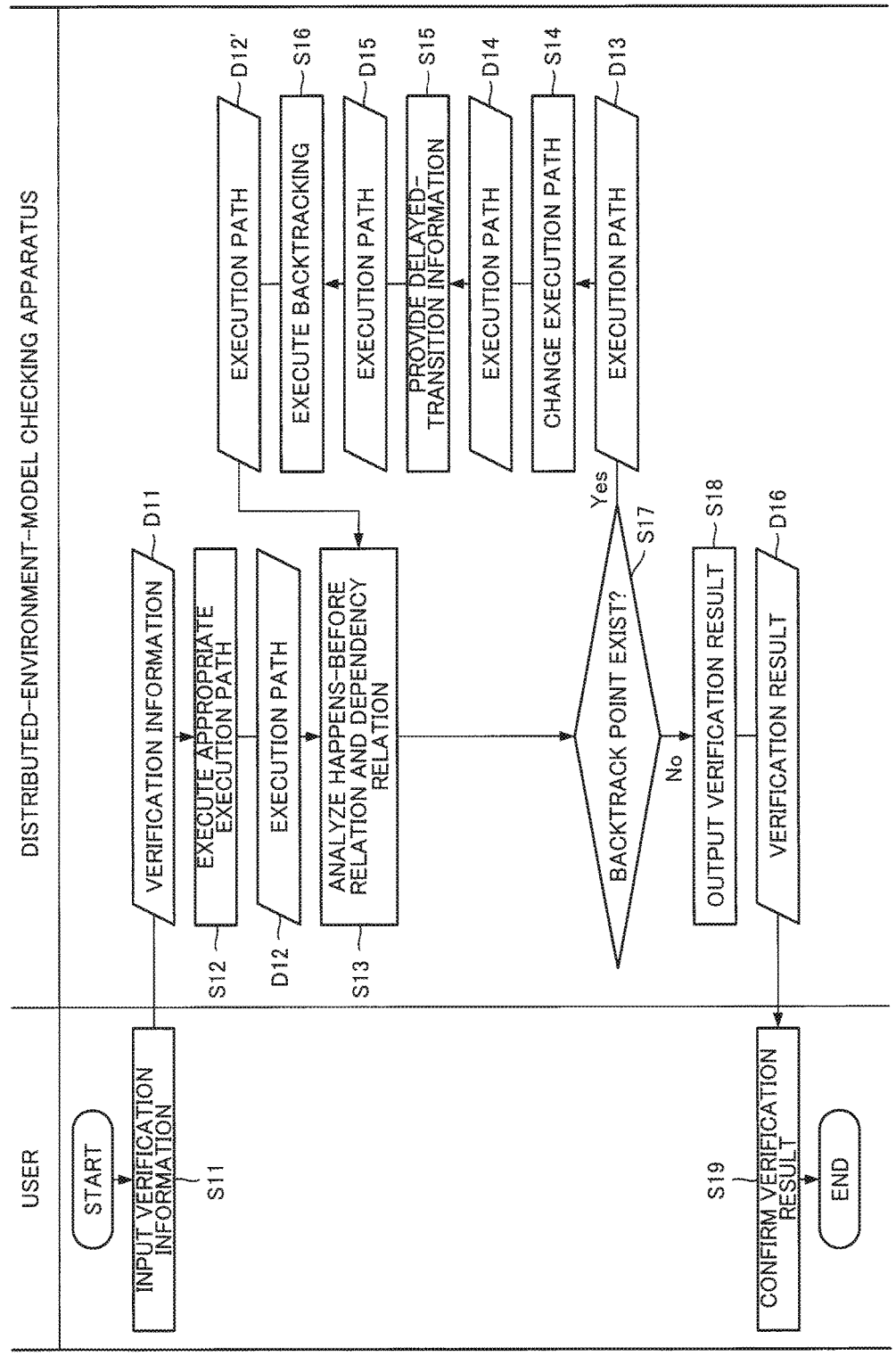
FIG. 5 is a flowchart illustrating an example of an overall operation according to the first exemplary embodiment of the present invention.

FIG. 5 is a flowchart for illustrating an overall operation according to the first exemplary embodiment of the present invention. With reference to FIG. 5, an operation according to the first exemplary embodiment of the present invention illustrated in FIG. 4 will be described in detail.

(Step S11)

A user creates verification information D11, and inputs the verification information D11 to the distributed-environment-model search unit 11 through the input apparatus 21.

(Step S12)

When receiving the verification information D11, the distributed-environment-model search unit 11 causes a distributed-environment model included in the verification information D11, and executes a state transition, and executes an appropriate execution path. The distributed-environment-model search unit 11 generates an execution path D12, and transfers the path to the distributed-environment-model-dependency-relation analysis unit 12.

(Step S13)

The distributed-environment-model-dependency-relation analysis unit 12 analyzes a dependency relation and a happens-before relation on the execution path D12. The distributed-environment-model-dependency-relation analysis unit 12 generates backtrack points on the execution path D12. The distributed-environment-model-dependency-relation analysis unit 12 returns an execution path D13 on which the backtrack points are generated to the distributed-environment-model search unit 11.

(Step S14)

The distributed-environment-model search unit 11 specifies the deepest (rearmost) backtrack point on the execution path D13, and makes a change to the execution path D13, on the basis of the specified backtrack point. The distributed-environment-model search unit 11 transfers an execution path D14 with the change, to the delayed-transition-information providing unit 13.

(Step S15)

The delayed-transition-information providing unit 13 analyzes the execution path D14 received from the distributed-environment-model search unit 11. The delayed-transition-information providing unit 13 provides information about a transition, execution of which is to be postponed in a subsequent search, for the execution path D14. Then, the delayed-transition-information providing unit 13 returns an execution path D15 provided with the information about the transition, execution of which is to be postponed, to the distributed-environment-model search unit 11.

(Step S16)

The distributed-environment-model search unit 11 causes the distributed-environment model to execute a state transition again from the deepest backtrack point on the execution path D15, and obtains a new execution path (D12'). The distributed-environment-model search unit 11 transfers the new execution path (D12') to the distributed-environment-model-dependency-relation analysis unit 12, as an execution path D12 in FIG. 4.

(Step S17)

The distributed-environment-model-dependency-relation analysis unit 12 receives the execution path D12 and determines whether or not to backtrack. When a backtrack point exists ("Yes" branch in Step S17), the unit proceeds to aforementioned Step S14. When a backtrack point does not exist ("No" branch in Step S17), the unit proceeds to Step S18 (verification result output). The unit repeats the procedure in Steps S13 to 16 until there is no backtrack point as a result of the determination in Step S17.

(Step S18)

The distributed-environment-model search unit 11 outputs a verification result D16 to the output apparatus 22. The distributed-environment-model search unit 11 outputs, for example, whether or not a property is satisfied, and, when the property is not satisfied, a counterexample indicating such a result, as the verification result D16.

(Step S19)

The user confirms the verification result output from the output apparatus 22.

(Details of Step S12 in FIG. 5)

Figure 6:
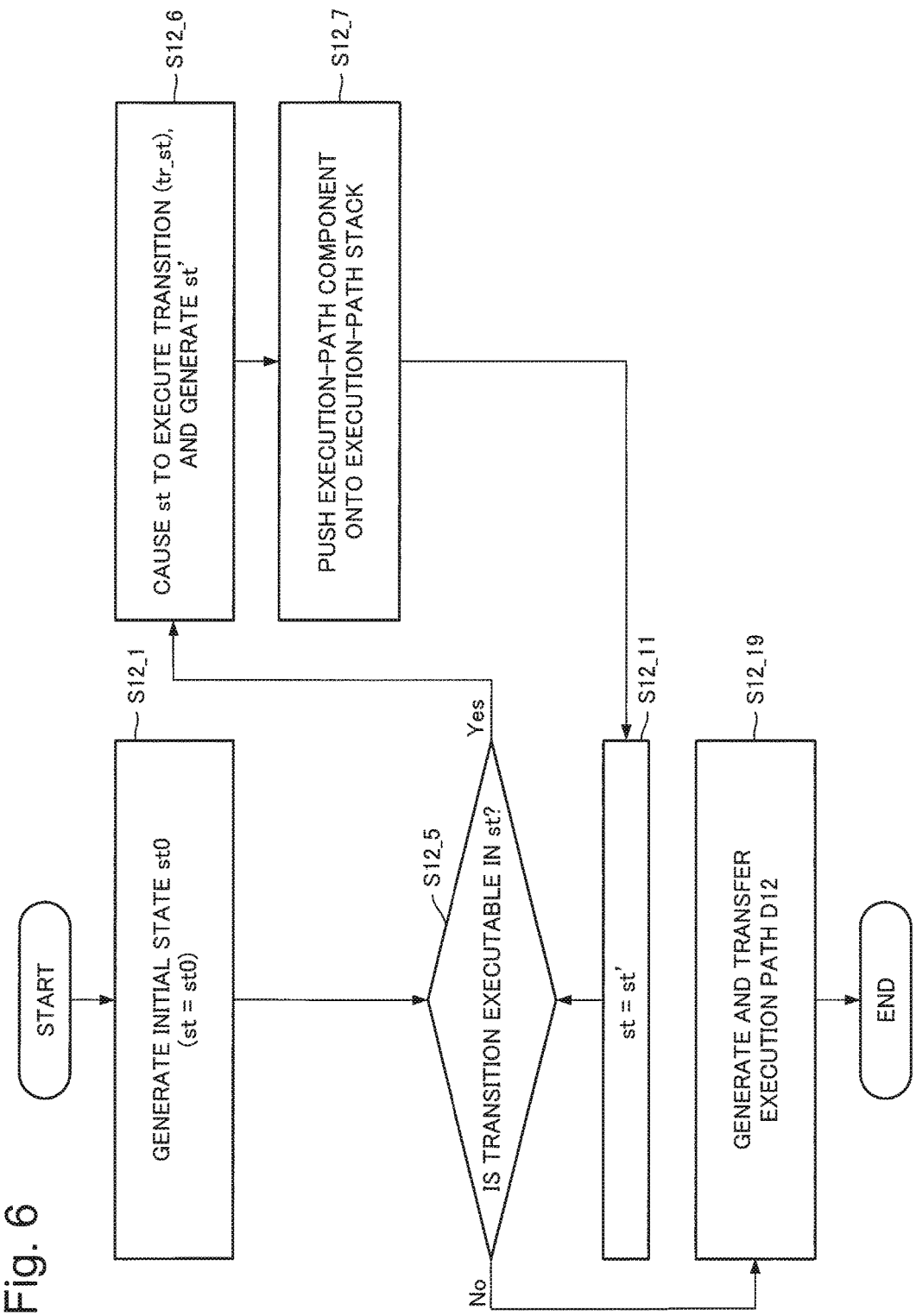
FIG. 6 is a flowchart illustrating an example of details of an operation in Step S12 in FIG. 5.

FIG. 6 is a flowchart illustrating details of the operation in Step S12 in FIG. 5. With reference to FIG. 6, the Step S12 will be described more in detail below.

(Step S12_1)

The distributed-environment-model search unit 11 extracts a distributed-environment model from the verification information D11. The distributed-environment-model search unit 11 generates an initial state st0 of the distributed-environment model, and sets a state st=st0.

(Step S12_5)

Next, the distributed-environment-model search unit 11 checks whether or not there are one or more transitions executable from the state st. When transition is executable in the state st ("Yes" branch in Step S12_5), the operation transfers to Step S12_6. When no transition is executable in the state st ("No" branch in Step S12_5), the operation transfers to Step S12_19.

(Step S12_6)

By removing each transition included in a transition set tr_set that can be acquired by use of Dependency in an execution-path component e1 with a transition tr_e1 included in the execution-path component e1 as a key (set of a transition in a dependency relation with the transition tr_e1) and the transition tr_e1 from Delay in the execution-path component e1 at the top of an execution-path stack (removing tr_e1 from a difference set between Delay in the execution-path component e1 and tr_set), the distributed-environment-model search unit 11 calculates Delay' (=Delay−tr_set−tr_e1).

The distributed-environment-model search unit 11 selects a transition tr_st not included in Delay' (transition not included in a transition set, execution of which is to be postponed after the state st), out of transitions executable by the state st.

The distributed-environment-model search unit 11 causes the state st to execute the transition tr_st and generates a next state st'. The execution-path stack refers to a stack (last-in-first-out) saving a process of an execution path currently being searched. A component of the stack is an execution-path component. The stack is provided in a storage apparatus such as an unillustrated memory.

When the execution-path stack is empty (=e1 does not exist), the distributed-environment-model search unit 11 sets Delay'={ } (empty set).

Then, the distributed-environment-model search unit 11 selects an arbitrary transition tr_st out of transitions executable from the state st. Even when a transition not included in Delay' as a transition executable by the state st does not exist, the distributed-environment-model search unit 11 selects an arbitrary transition tr_st out of transitions executable by the state st. The above describes the processing in Step S12_6.

(Step S12_7)

Next, the distributed-environment-model search unit 11 generates a new execution-path component e2=(st, tr_st, { }, {tr_st}, Delay, Dependency), and push the component onto the execution-path stack.

The content of Delay in the execution-path component e2 is aforementioned Delay'. The content of Dependency in the execution-path component e2 is obtained by removing a pair of the transition tr_e1 and the transition set tr_set from Dependency in the execution-path component e1.

(Step S12_11)

Next, the distributed-environment-model search unit 11 sets st=st', and returns to Step S12_5.

(Step S12_19)

When there is no transition executable by the state st in Step S12_5 ("No" branch in Step S12_5), the distributed-environment-model search unit 11 transfers the content of the execution-path stack at that point, as an execution path D12, to the distributed-environment-model-dependency-relation analysis unit 12, and ends Step S12.

(Details of Step S13 in FIG. 5)

Figure 7:
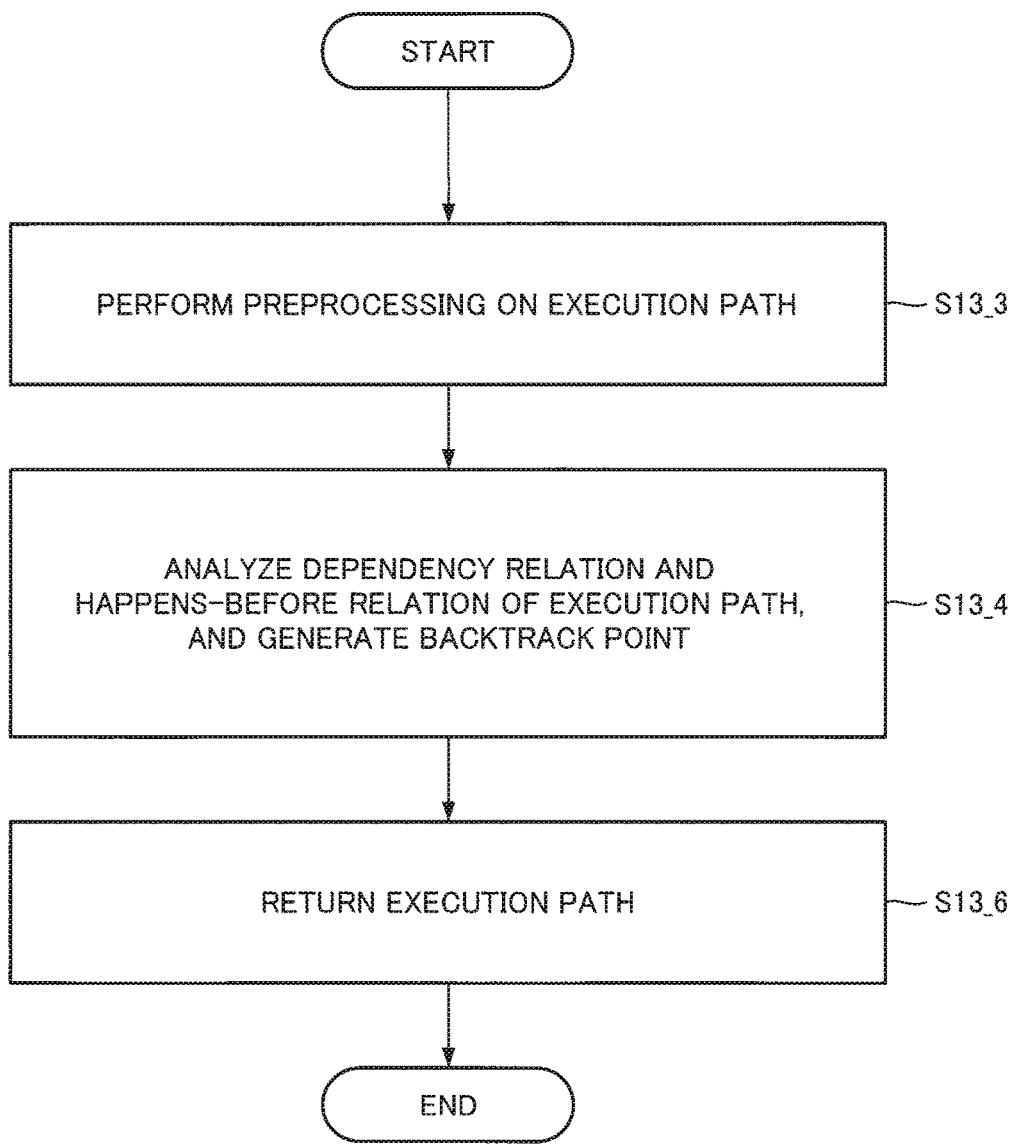
FIG. 7 is a flowchart illustrating an example of details of an operation in Step S13 in FIG. 5.

FIG. 7 is a flowchart illustrating details of the operation in Step S13 in FIG. 5. With reference to FIG. 7, the Step S13 will be described more in detail.

(Step S13_3)

The distributed-environment-model-dependency-relation analysis unit 12 first performs preprocessing for analyzing a happens-before relation on the execution path D12.

(Step S13_4)

Next, the distributed-environment-model-dependency-relation analysis unit 12 analyzes a dependency relation and a happens-before relation, and generates backtrack points.

(Step S13_6)

Finally, the distributed-environment-model-dependency-relation analysis unit 12 returns an execution path D13 on which the backtrack point is generated to the distributed-environment-model search unit 11. The above concludes Step S13.

(Details of Step S13_3 in FIG. 7)

Figure 8:
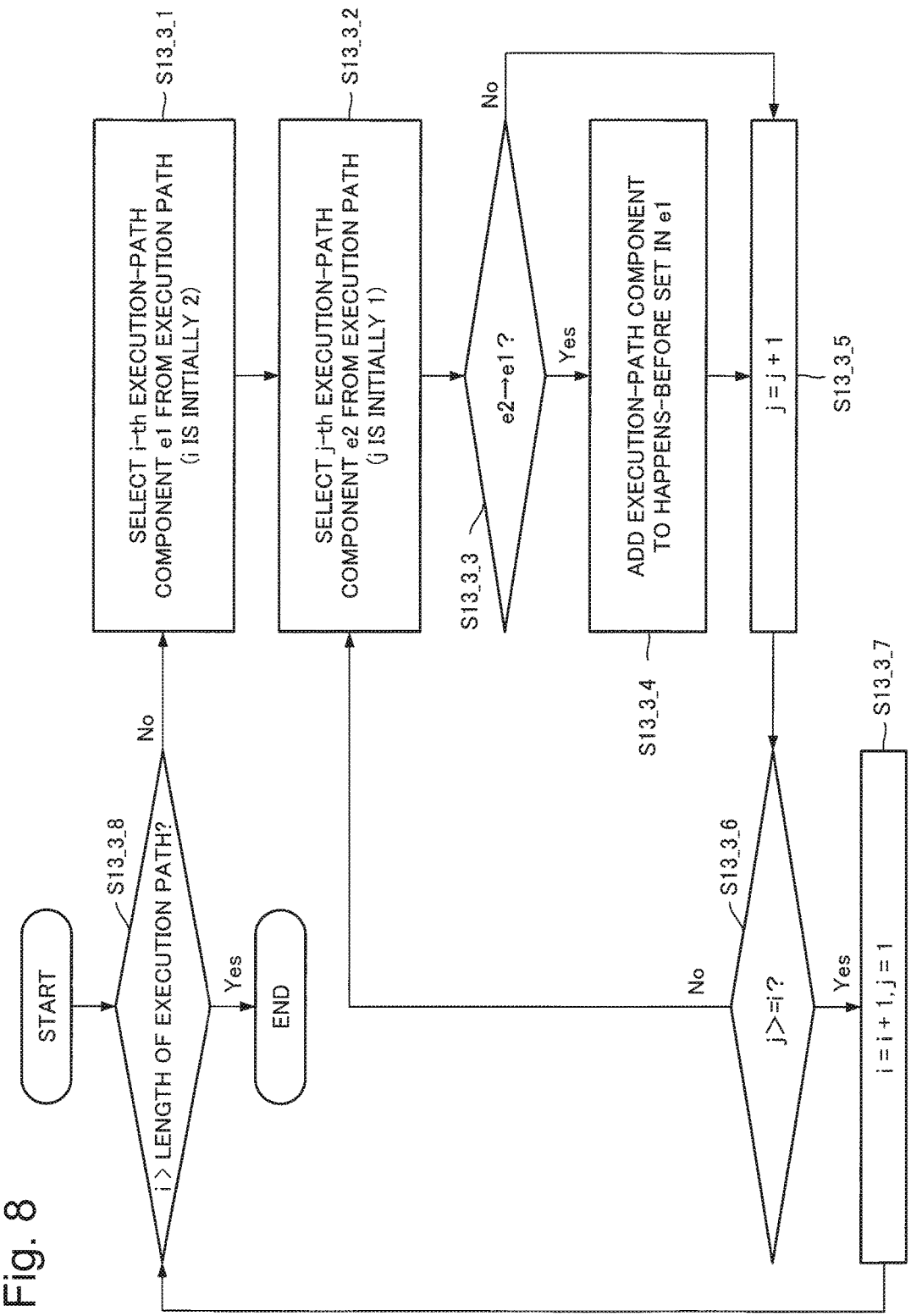
FIG. 8 is a flowchart illustrating an example of details of an operation in Step S13_3 in FIG. 7.

FIG. 8 is a flowchart illustrating details of the operation in Step S13_3 in FIG. 7. With reference to FIG. 8, the Step S13_3 will be described more in detail. In Step S13_3 in FIG. 7, with respect to each component in an execution path being an analysis target, the distributed-environment-model-dependency-relation analysis unit 12 obtains an execution-path component having a transition in a happens-before relation (always occurs earlier) with a transition in the component. Accordingly, a data structure (happens-before set) retaining a set of execution-path components having a transition in a happens-before relation with a transition in the component is prepared for each execution-path component.

(Step S13_3_1)

The distributed-environment-model-dependency-relation analysis unit 12 first selects an i-th (i is initially 2) execution-path component e1 from an execution path being an analysis target.

(Step S13_3_2)

Next, the distributed-environment-model-dependency-relation analysis unit 12 selects a j-th (j is initially 1) execution-path component e2.

(Step S13_3_3)

Additionally, the distributed-environment-model-dependency-relation analysis unit 12 compares a transition in the execution-path component e1 with a transition in the execution-path component e2. When "the transition in the execution-path component e2→the transition in the execution-path component e1" does not hold, the operation of the distributed-environment-model-dependency-relation analysis unit 12 transfers to Step S13_3_5.

(Step S13_3_4)

When "the transition in the execution-path component e2→the transition in the execution-path component e1" (happens-before relation) holds, the distributed-environment-model-dependency-relation analysis unit 12 adds the execution-path component e2 itself and every execution-path component included in an happens-before set in the execution-path component e2 to a happens-before set (initially empty) in the execution-path component e1.

In the comparison in Step S13_3_3, the distributed-environment-model-dependency-relation analysis unit 12 specifically compares whether or not a received message recv in the transition in the execution-path component e1 matches a transmitted message send in the execution-path component e2. When the messages match, the unit determines that a happens-before relation holds.

(Step S13_3_5)

Next, the distributed-environment-model-dependency-relation analysis unit 12 increments the value of j by 1.

(Step S13_3_6)

The distributed-environment-model-dependency-relation analysis unit 12 determines whether the value of j is greater than or equal to i, and, when the value of j is less than i ("No" branch in Step S13_3_6), repeats Steps S13_3_2 to S13_3_5.

(Step S13_3_7)

When the value of j becomes greater than or equal to i, the distributed-environment-model-dependency-relation analysis unit 12 increments the value of i by 1 and sets the value of j to 1.

(Step S13_3_8)

The distributed-environment-model-dependency-relation analysis unit 12 determines whether or not the value of i is greater than the length of the execution path being the analysis target. When the value of i is less than or equal to the length of the execution path being the analysis target ("No" branch in Step S13_3_8), the unit repeats Steps S13_3_1 to S13_3_7. When the value of i is greater than the length of the execution path being the analysis target ("Yes" branch in Step S13_3_8), the unit ends Step S13_3.

(Details of Step S13_4 in FIG. 7)

Figure 9:
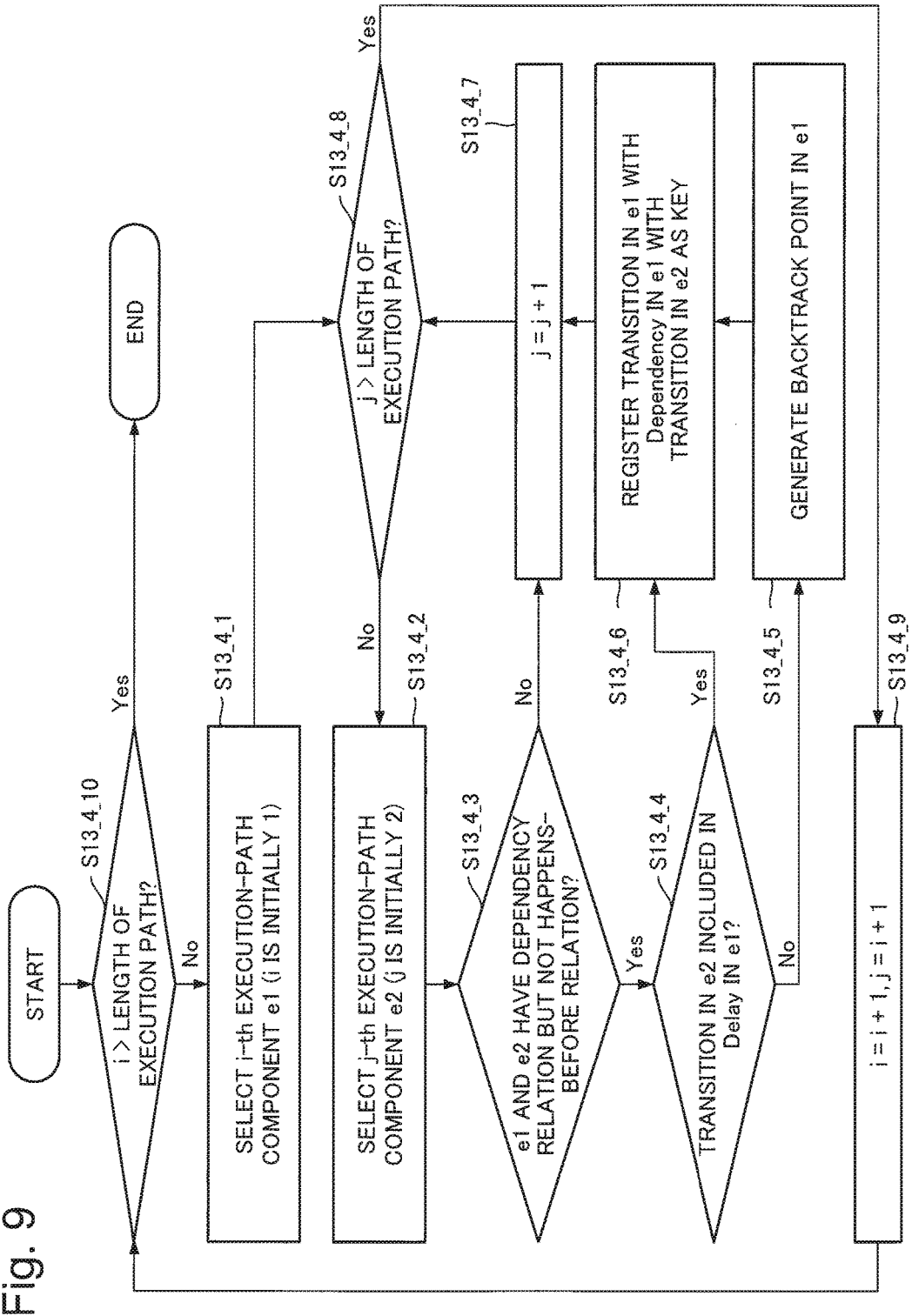
FIG. 9 is a flowchart illustrating an example of details of an operation in Step S13_4 in FIG. 7.

FIG. 9 is a flowchart illustrating details of the operation in Step S13_4 in FIG. 7. With reference to FIG. 9, the Step S13_4 will be described more in detail.

(Step S13_4_1)

The distributed-environment-model-dependency-relation analysis unit 12 first selects an i-th (i is initially 1) execution-path component e1 from an execution path being an analysis target.

(Step S13_4_2)

Next, the distributed-environment-model-dependency-relation analysis unit 12 selects a j-th (j is initially i+1) execution-path component e2 from the execution path being the analysis target.

(Step S13_4_3)

Additionally, the distributed-environment-model-dependency-relation analysis unit 12 compares a transition in the execution-path component e1 with a transition in the execution-path component e2, and checks whether or not the transitions in the execution-path components e1 and e2 are "in a dependency relation but not in a happens-before relation."

With regard to the dependency relation in the comparison in Step S13_4_3, the distributed-environment-model-dependency-relation analysis unit 12 determines that a dependency relation exists when operating nodes node in the transitions in the execution-path components e1 and e2 are equivalent, and either of state change flags change_flag in the transitions e1 and e2 is true.

With regard to the happens-before relation in the comparison in Step S13_4_3, the distributed-environment-model-dependency-relation analysis unit 12 determines that the transitions in the execution-path components e1 and e2 are in a happens-before relation when the transition in the execution-path component e1 is included in a happens-before set in the execution-path component e2. When the transitions in the execution-path components e1 and e2 do not satisfy the condition "in a dependency relation but not in a happens-before relation," the operation of the distributed-environment-model-dependency-relation analysis unit 12 transfers to Step S13_4_7.

(Step S13_4_4)

When it is found that the transitions in the execution-path component e1 and e2 are "in a dependency relation but not in a happens-before relation" in Step S13_4_3, the distributed-environment-model-dependency-relation analysis unit 12 checks whether or not the transition in the execution-path component e2 is included in Delay in the execution-path component e1. When the transition in the execution-path component e2 is included in Delay in the execution-path component e1, the operation of the distributed-environment-model-dependency-relation analysis unit 12 transfers to Step S13_4_6.

(Step S13_4_5)

When the transition in the execution-path component e2 is not included in Delay in the execution-path component e1, the distributed-environment-model-dependency-relation analysis unit 12 selects the frontmost execution-path component (referred to as "e3") in the execution path being the analysis target, out of execution-path components included in the happens-before set in the execution-path component e2, and generates a backtrack point, by adding a transition in the execution-path component e3 to a backtrack set Backtrack in the execution-path component e1.

(Step S13_4_6)

Next, the distributed-environment-model-dependency-relation analysis unit 12 registers the transition in the execution-path component e1 with Dependency in the execution-path component e1 with the transition in the execution-path component e2 as a key.

(Step S13_4_7)

Next, the distributed-environment-model-dependency-relation analysis unit 12 increments the value of j by 1.

(Step S13_4_8)

The distributed-environment-model-dependency-relation analysis unit 12 determines whether the value of j is greater than the length of the execution path being the analysis target, and, when j is less than or equal to the length of the execution path ("No" branch in Step S13_4_8), repeats Steps S13_4_2 to S13_4_7.

(Step S13_4_9)

When the value of j becomes greater than the length of the execution path being the analysis target ("Yes" branch in Step S13_4_8), the distributed-environment-model-dependency-relation analysis unit 12 increments the value of i by 1, sets the value of j to i+1, and the operation transfers to Step S13_4_10.

(Step S13_4_10)

The distributed-environment-model-dependency-relation analysis unit 12 determines whether or not the value of i is greater than the length of the execution path. When the value of i is less than or equal to the length of the execution path ("No" branch in Step S13_4_10), Steps S13_4_1 to S13_4_9 is repeated. When the value of i is greater than the length of the execution path ("Yes" branch in Step S13_4_10), Step S13_4 ends.

(Details of Step S14 in FIG. 5)

Figure 10:
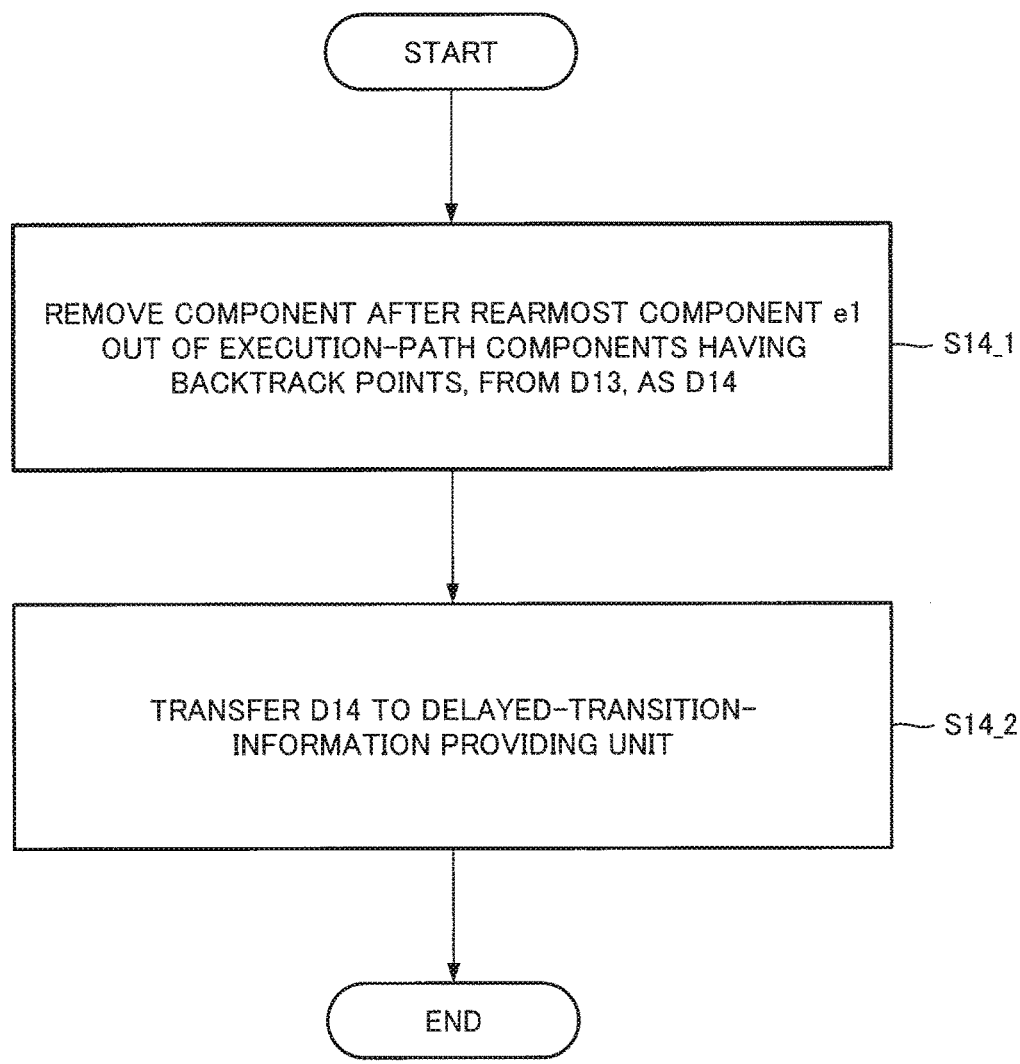
FIG. 10 is a flowchart illustrating an example of details of an operation in Step S14 in FIG. 5.

FIG. 10 is a flowchart illustrating details of the operation in Step S14 (execution path change) in FIG. 5. With reference to FIG. 10, the Step S14 will be described more in detail.

(Step S14_1)

In the execution path D13 acquired from the distributed-environment-model-dependency-relation analysis unit 12, through Steps S13 and S17 in FIG. 5, the distributed-environment-model search unit 11 discovers the rearmost execution-path component e1 out of execution-path components having backtrack points (=a difference set obtained by subtracting Done from a backtrack set Backtrack is not empty), and removes an execution-path component after the execution-path component e1 (not including e1) from the execution path D13 as an execution path D14. That is, the last execution-path component in the execution path D14 is the execution-path component e1.

(Step S14_2)

Next, the distributed-environment-model search unit 11 transfers the execution path D14 to the delayed-transition-information providing unit 13.

(Details of Step S15 in FIG. 5)

Figure 11:
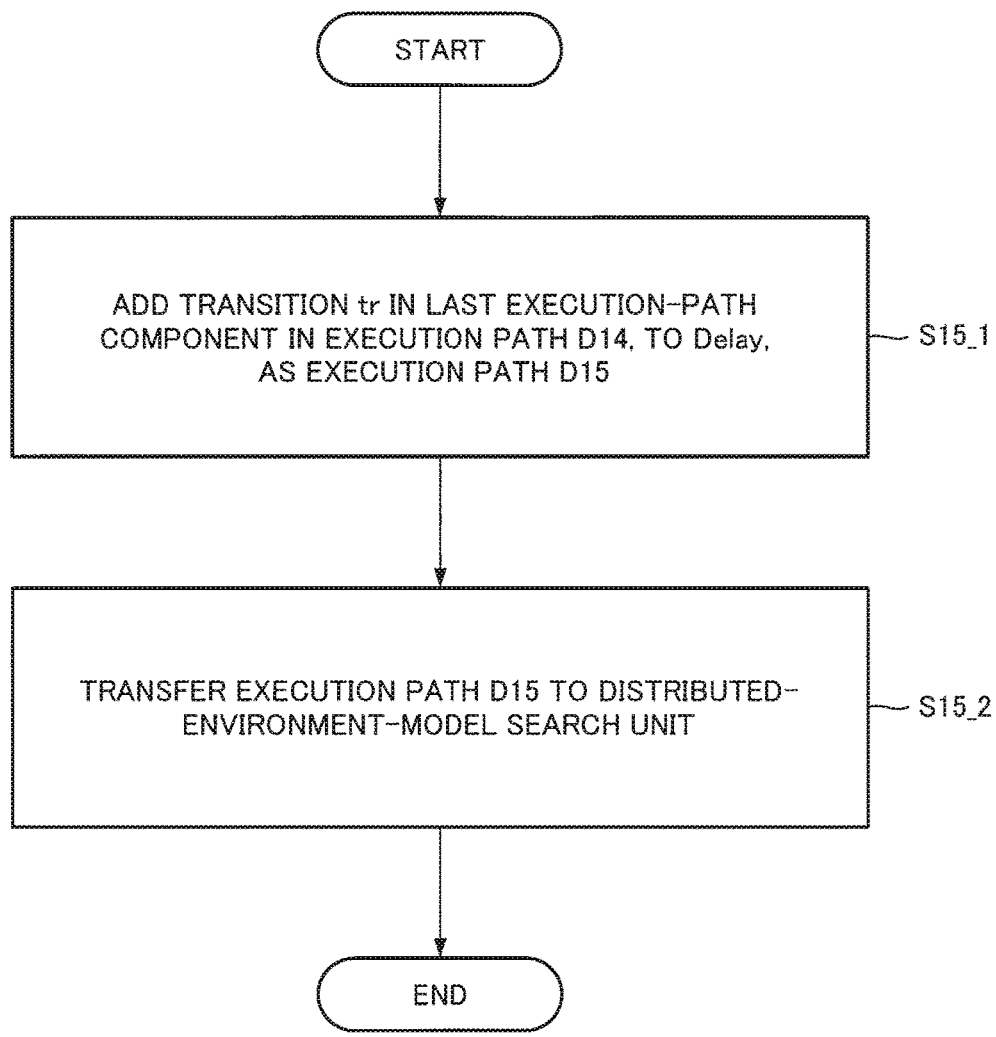
FIG. 11 is a flowchart illustrating an example of details of an operation in Step S15 in FIG. 5.

FIG. 11 is a flowchart illustrating Step S15 (providing delayed-transition information by the delayed-transition-information providing unit 13) in FIG. 5. With reference to FIG. 11, the Step S15 will be described more in detail. As described above, the delayed-transition-information providing unit 13 analyzes the execution path D14 received from the distributed-environment-model search unit 11, and provides information about a transition, execution of which is to be postponed in a subsequent search by the distributed-environment-model search unit 11, for the path, as an execution path D15.

(Step S15_1)

The delayed-transition-information providing unit 13 adds a transition tr in the last execution-path component e1 in the execution path D14 received from the distributed-environment-model search unit 11, to Delay in the execution-path component e1. The delayed-transition-information providing unit 13 sets an execution path D15 to the path obtained by adding the transition tr in the last execution-path component e1 in the execution path D14 to Delay in the e1.

(Step S15_2)

Next, the delayed-transition-information providing unit 13 returns the execution path D15 to the distributed-environment-model search unit 11.

(Details of Step S16 in FIG. 5)

Figure 12:
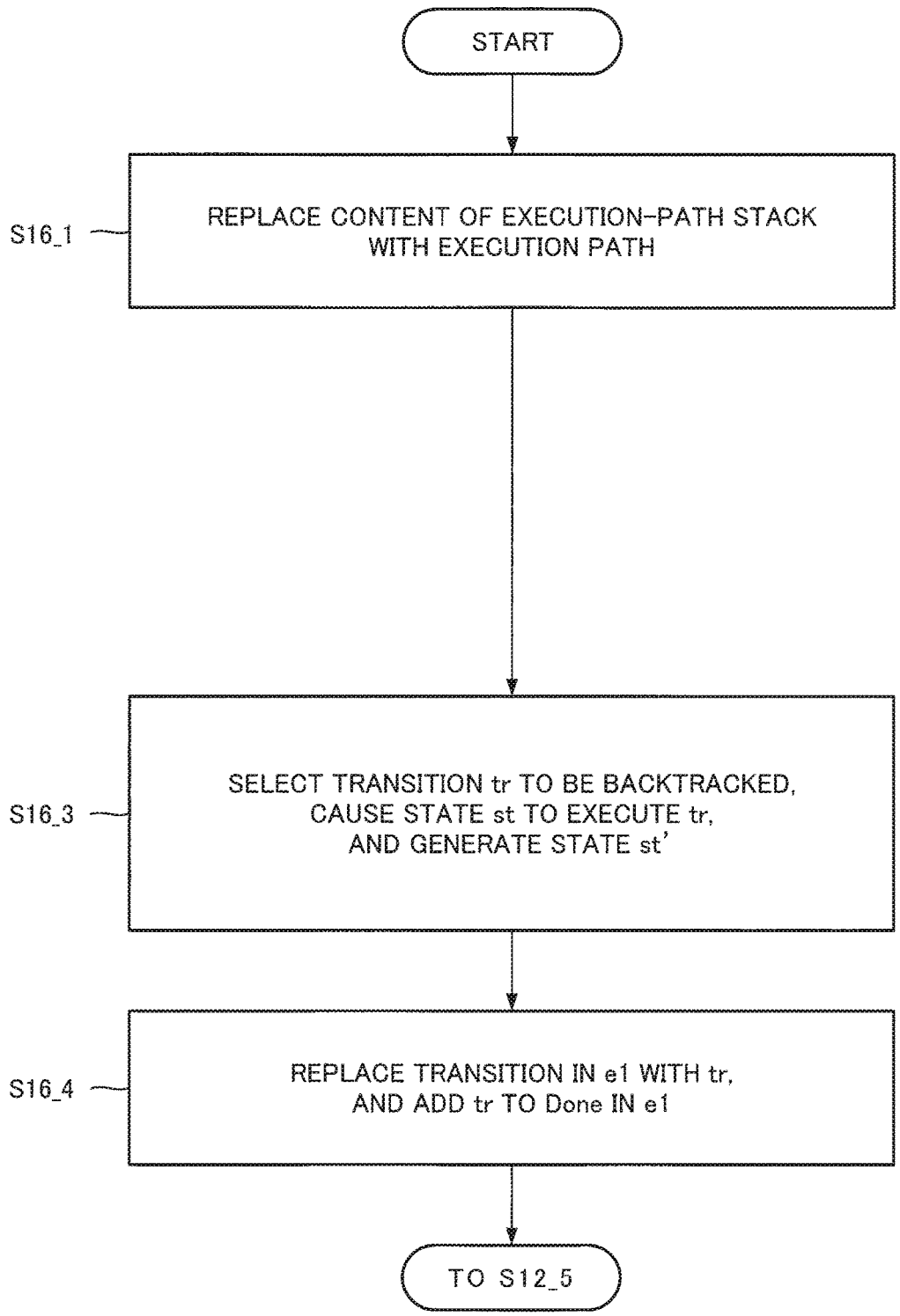
FIG. 12 is a flowchart illustrating an example of details of an operation in Step S16 in FIG. 5.

FIG. 12 is a flowchart illustrating details of the operation in Step S16 (backtracking execution) in FIG. 5. With reference to FIG. 12, the Step S16 will be described more in detail.

(Step S16_1)

The distributed-environment-model search unit 11 first replaces a content of the execution-path stack with the execution path D15 acquired in Step S15 in FIG. 5.

(Step S16_3)

Next, the distributed-environment-model search unit 11 selects an arbitrary transition tr included in a backtrack set Backtrack but not included in Done in the last execution-path component e1 in the execution-path stack, causes a state st included in the execution-path component e1 to execute the transition tr, and generates a next state st'.

(Step S16_4)

Additionally, the distributed-environment-model search unit 11 replaces the transition included in the execution-path component e1 with tr and adds the transition tr to Done. Subsequently, the operation proceeds to Step S12_5 in FIG. 6. The subsequent procedure is similar to Step S12 described with reference to FIG. 6, and therefore description thereof is omitted.

Next, an effect according to the first exemplary embodiment will be described. Unlike the case with DPOR-DS, when resuming a search by backtracking in model checking using DPOR, the distributed-environment-model checking apparatus 1 according to the first exemplary embodiment specifies a transition, execution of which is postponed during the search (delayed transition), instead of specifying a transition sequence executed first.

Even when there is a transition, a content of which is changed in a search after backtracking from a previous search, the first exemplary embodiment simply postpones execution of a specific transition. Accordingly, a wasteful search attempting to execute an inexecutable transition does not occur, unlike the case with the aforementioned DPOR-DS method.

Consequently, the first exemplary embodiment provides enhanced searching efficiency when DPOR is applied to model checking of a distributed-environment model.

Second Exemplary Embodiment

Next, a second exemplary embodiment of the present invention will be described in detail with reference to the drawings. A basic configuration according to the second exemplary embodiment is as illustrated in FIG. 4. Description of a part similar to the first exemplary embodiment will be omitted, and only a different part will be described. First, with reference to FIG. 4, the configuration according to the second exemplary embodiment of the present invention will be described in detail.

When receiving verification information D11 including a distributed-environment model and a property to be satisfied by the distributed-environment model, from a user through the input apparatus, the distributed-environment-model search unit 11 performs model checking by use of the verification information D11. Then, the distributed-environment-model search unit 11 returns a verification result D16 including whether or not the property is satisfied, and, when the property is not satisfied, a counterexample indicating such a result, to the user through the output apparatus. It is assumed that the distributed-environment model is a model representing a network (OpenFlow network) environment controlled by OpenFlow, and a specification thereof has only to be a state transition system conforming to an OpenFlow specification, and is not limited to a specific specification. A description format of the distributed-environment model has only to be mechanically processable, and is not limited to a specific format. The specification of the distributed-environment model according to the second exemplary embodiment in the description below is assumed be as follows.

A definition of a state in the distributed-environment model according to the second exemplary embodiment will be described. The state is defined as a tuple of six sets (T, S, C, P, M, Q).

T is a set of terminals. A component t of T (t∈T) has a variable sv representing a state thereof.

S is a set of switches. A component s of S (s∈S) has a variable E representing a set of flow entries installed on a switch. A component e of E (e∈E) is a flow entry. A component e of E is defined as a tuple (mr, af) of a value mr representing a content of a matching rule and a value af representing a content of an action field.

C is a set of controllers. A component c of C (c∈C) has a variable V representing a set of variables globally handled by each operation model of a controller c. A component v of V (v∈V) is one of variables globally handled by an operation model of a controller, and is defined as a tuple (vn, vv) of a value vn indicating a name of a variable and a value vv representing a content of the variable.

P is a set of packets. A component p of P (p∈P) has a variable pv representing a content of a packet.

M is a set of OpenFlow messages. A component m of M (m∈M) has a variable mv representing a content of an OpenFlow message.

Q is a set of communication ports. A component q of Q (q∈Q) is a communication port provided by a first-in-first-out (FIFO) queue storing a packet and an OpenFlow message.

Each of terminals, switches, and controllers has communication ports for communication with another terminal, switch, and controller, one for transmission and another for reception, with respect to each communicable terminals, switches, and controllers. A transmitting communication port for one terminal, switch, or controller is a receiving communication port for another terminal, switch, or controller, and vice versa. A terminal, a switch, and a controller may be collectively referred to as a node.

A definition of a transition in the distributed-environment model according to the second exemplary embodiment will be described.

It is assumed that a transition represents a situation of change in a state of the distributed-environment model (OpenFlow network) by any of terminals, switches, or controllers existing in the model executing an operation of a specific unit. The operation of a specific unit specifically includes following six types.
1. Packet transmission by a terminal
2. Packet reception by a terminal
3. Flow-entry-application by a switch
4. Packet-in message transmission by a switch
5. OpenFlow message reception by a switch
6. Program execution by a controller Each of the six types of operations will be described in detail below.

A transition by packet transmission by a terminal will be described. A terminal is able to execute a packet-transmission operation, according to an own state sv. In a transition by packet transmission by a terminal, a terminal t generates a packet p, stores the packet p on a transmitting communication port (=a packet receiving communication port for a switch s) on the terminal t, and changes (may not change) a content of the state sv of the terminal t.

Next, a transition by packet reception by a terminal will be described. When one or more packets are stored on an own packet receiving communication port, a terminal is able to execute a packet-reception operation. In a transition by packet reception by a terminal, a first packet p stored in a packet receiving communication port q on a terminal t on which one or more packets are stored, is taken from the port. Then, a content of a state sv of the terminal t is changed (may not be changed), according to a content pv of the packet p.

Next, a state transition by flow-entry-application by a switch will be described. When one or more packets are stored on an own packet receiving communication port, and a flow entry applicable to the first packet stored on the packet receiving port is available, a switch is able to execute a flow-entry-application operation. In a flow-entry-application operation by a switch, the first packet p stored on a packet receiving communication port q of a switch s on which one or more packets are stored, is first taken from the port. Next, the switch s compares a matching rule mr in each flow entry held by the switch s with a content pv of the packet p, and selects a flow entry e applicable to the packet p. Finally, the switch executes an operation, in accordance with an action field of in the flow entry e.

Next, a state transition by packet-in message (one of OpenFlow messages) transmission by a switch will be described. When one or more packets are stored on an own packet receiving communication port, and a flow entry applicable to the first packet stored on the packet receiving port is not available, a switch is able to execute a packet-in-message transmission operation. In a packet-in-message transmission operation by a switch, the first packet p, stored on a packet receiving communication port q1 of a switch s on which one or more packets are stored, is first taken from the port. Next, the switch stores a packet-in message m including information about the packet p on an OpenFlow-message transmitting communication port q2 corresponding to a controller.

Next, a state transition by OpenFlow message reception by a switch will be described.

When one or more OpenFlow messages are stored on an own OpenFlow message receiving communication port, a switch is able to execute an OpenFlow-message-reception operation. In an OpenFlow message reception operation by a switch, the first OpenFlow message m stored on an OpenFlow-message receiving communication port q on a switch s on which one or more OpenFlow messages are stored is first taken from the port. Next, the switch executes an operation, in accordance with a content my in the OpenFlow message m.

Next, a state transition by program execution by a controller will be described. When one or more OpenFlow messages are stored on an own OpenFlow-message receiving communication port, a controller is able to execute a program execution operation. In a program-execution-operation by a controller, a first OpenFlow message m, stored on an OpenFlow-message receiving communication port q on a controller c on which one or more OpenFlow messages are stored, is first taken from the port. Next, referring to a content my in the OpenFlow message m, the controller executes an operation corresponding to my, out of controller operations defined in a distributed-environment model included in verification information D11 (when a corresponding operation is not defined, a default operation specified in an OpenFlow specification is executed).

In the second exemplary embodiment of the present invention, a dependency relation is defined as follows, in consideration of the specification of the distributed-environment model used in the second exemplary embodiment and the DPOR algorithm.

A node operating in a transition t1 and a node operating in a transition t2 are a same node.

In the second exemplary embodiment of the present invention, a happens-before relation is defined as follows, in consideration of the specification of the distributed-environment model according to the second exemplary embodiment and the DPOR algorithm.

1. When a packet or a message transmitted in a transition t1 and a packet or an OpenFlow message received in a transition t2 are same, then t1→t2.
2. When a flow entry installed in a transition t1 and a flow entry applied in a transition t2 are same, then t1→t2.
3. When a packet or an OpenFlow message pm1 received in a transition t1 and a packet or an OpenFlow message pm2 received in a transition t2 are stored on a same receiving communication port q, and a transition t3 storing pm1 in q and a transition t4 storing pm2 in q have a relation t3→t4, then t1→t2.
4. When t1→t2 and t2→t3, then t1→t3.

Next, a data structure of a transition according to the second exemplary embodiment of the present invention will be described. A transition is expressed by a tuple of seven components (node, type, send, recv, port, install, apply).

node represents a terminal, a switch, and a controller operating in the transition.

send represents a set of packets or OpenFlow messages transmitted in the transition.

recv represents a packet or an OpenFlow message received in the transition.

port represents a receiving communication port on which a packet or an OpenFlow message received in the transition is stored.

install represents a flow entry installed in the transition.

apply represents a flow entry applied in the transition.

When a state executes a transition in a search by the distributed-environment-model search unit 11, transition data based on the data structure are generated after a value in each field is properly set, according to a content of the transition.

Next, an operation according to the second exemplary embodiment of the present invention will be described in detail.

Step S13_3 in FIG. 7 will be described more in detail with reference to FIG. 8. While a procedure flow in Step S13_3 is similar to the first exemplary embodiment, a content of Step S13_3_3 in FIG. 8 is different, and therefore only the content of Step S13_3_3 will be described, and description of the remaining part will be omitted.

In Step S13_3_3, the distributed-environment-model-dependency-relation analysis unit 12 compares a transition in the execution-path component e1 with a transition in the execution-path component e2, and confirms whether or not "the transition in the execution-path component e2→the transition in the execution-path component e1" (happens-before relation) holds.

Specifically, the distributed-environment-model-dependency-relation analysis unit 12 first confirms whether or not a received message recv in the transition in the execution-path component e1 is included in a transmitted message set send in the execution-path component e2.

When the received message recv in the transition in the execution-path component e1 is included in the transmitted message set send in the execution-path component e2, the distributed-environment-model-dependency-relation analysis unit 12 determines that a happens-before relation exists. When the message is not included, the distributed-environment-model-dependency-relation analysis unit 12 compares whether or not a flow entry applied in the transition in the execution-path component e1 matches a flow entry installed in the transition in the execution-path component e2.

When the flow entry applied in the transition in the execution-path component e1 matches the flow entry installed in the transition in the execution-path component e2, the distributed-environment-model-dependency-relation analysis unit 12 determines that a happens-before relation exists. When the entries do not match, the distributed-environment-model-dependency-relation analysis unit 12 compares whether or not receiving communication ports port used in the transitions in the execution-path component e1 and the execution-path component e2, respectively, match one another.

When the receiving communication ports port used in the transitions in the execution-path component e1 and the execution-path component e2 do not match, the distributed-environment-model-dependency-relation analysis unit 12 determines that a happens-before relation does not exist. When the ports match, the distributed-environment-model-dependency-relation analysis unit 12 searches for an execution-path component e3 having a transition having send including the received message recv in the transition in the execution-path component e1, and an execution-path component e4 having a transition having send including the received message recv in the transition in the execution-path component e2, from the execution path being the analysis target, and confirms whether or not the execution-path component e4 is included in a happens-before set in the execution-path component e3.

When the execution-path component e4 is included in the happens-before set in the execution-path component e3, the distributed-environment-model-dependency-relation analysis unit 12 determines that a happens-before relation exists, and, when the component is not included, determines that a happens-before relation does not exist.

(Details of Step S13_4 in FIG. 7)

FIG. 9 is a diagram illustrating details of the operation in Step S13_4 in FIG. 7. With reference to FIG. 9, Step S13_4 will be described more in detail.

While a procedure flow in Step S13_4 in FIG. 9 is similar to that of the first exemplary embodiment, a content of Step S13_4_3 is different, and therefore only the content of Step S13_4_3 will be described, and description of the remaining part will be omitted.

(Step S13_4_3)

The distributed-environment-model-dependency-relation analysis unit 12 compares a transition in the execution-path component e1 with a transition in the execution-path component e2, and confirms whether or not the transitions are "in a dependency relation but not in a happens-before relation."

With regard to the dependency relation in the comparison in Step S13_4_3, the distributed-environment-model-dependency-relation analysis unit 12 determines that a dependency relation exists when operating nodes node in the transitions in the execution-path components e1 and e2 match. With regard to the happens-before relation, the procedure flow is similar to Step S13_4_3 according to the first exemplary embodiment, and therefore description thereof is omitted.

An effect according to the second exemplary embodiment of the present invention will be described below. Unlike the case with DPOR-DS, when resuming a search by backtracking in model checking using DPOR, the distributed-environment-model checking apparatus 1 according to the second exemplary embodiment specifies a transition, execution of which is postponed during the search (delayed transition), instead of specifying a transition sequence executed first.

Even when there is a transition, a content of which is changed in a search after backtracking from a previous search, the second exemplary embodiment of the present invention postpones execution of a specific transition. A wasteful search attempting to execute an inexecutable transition may occur in the case of the aforementioned DPOR-DS method. The second exemplary embodiment does not involve such a case. Consequently, the second exemplary embodiment provides enhanced searching efficiency when DPOR is applied to model checking of a distributed-environment model representing an OpenFlow network environment.

In a search by model checking, the distributed-environment-model checking apparatus 1 according to the second exemplary embodiment stores and manages a searched state, similarly to a third exemplary embodiment described below. Then, the distributed-environment-model checking apparatus 1 may store and manage a searched transition for each path, by use of a graph (such as a directed graph) representing contents of transitions executed in the search and an order thereof as a history. In storing and managing the searched states and transitions, a searched state may be associated with a transition executed therefrom (details will be described in the following third exemplary embodiment). Then, when reaching a searched state during a search in model checking, since the searched state is saved and managed, being associated with history information about transitions executed from the searched state, the apparatus acquires the history information. Then, the apparatus may simulatively assume that transitions similar to the history information are executed after the reached state, analyze a dependency relation and a happens-before relation, generate a backtrack point, and discontinue the search. The apparatus is able to analyze a dependency relation and a happens-before relation without searching after the searched state again. Consequently, the search after the searched state can be discontinued even when DPOR is applied to model checking of a distributed-environment model representing an OpenFlow network environment. Consequently, enhanced searching efficiency is provided.

Third Exemplary Embodiment

Figure 13:
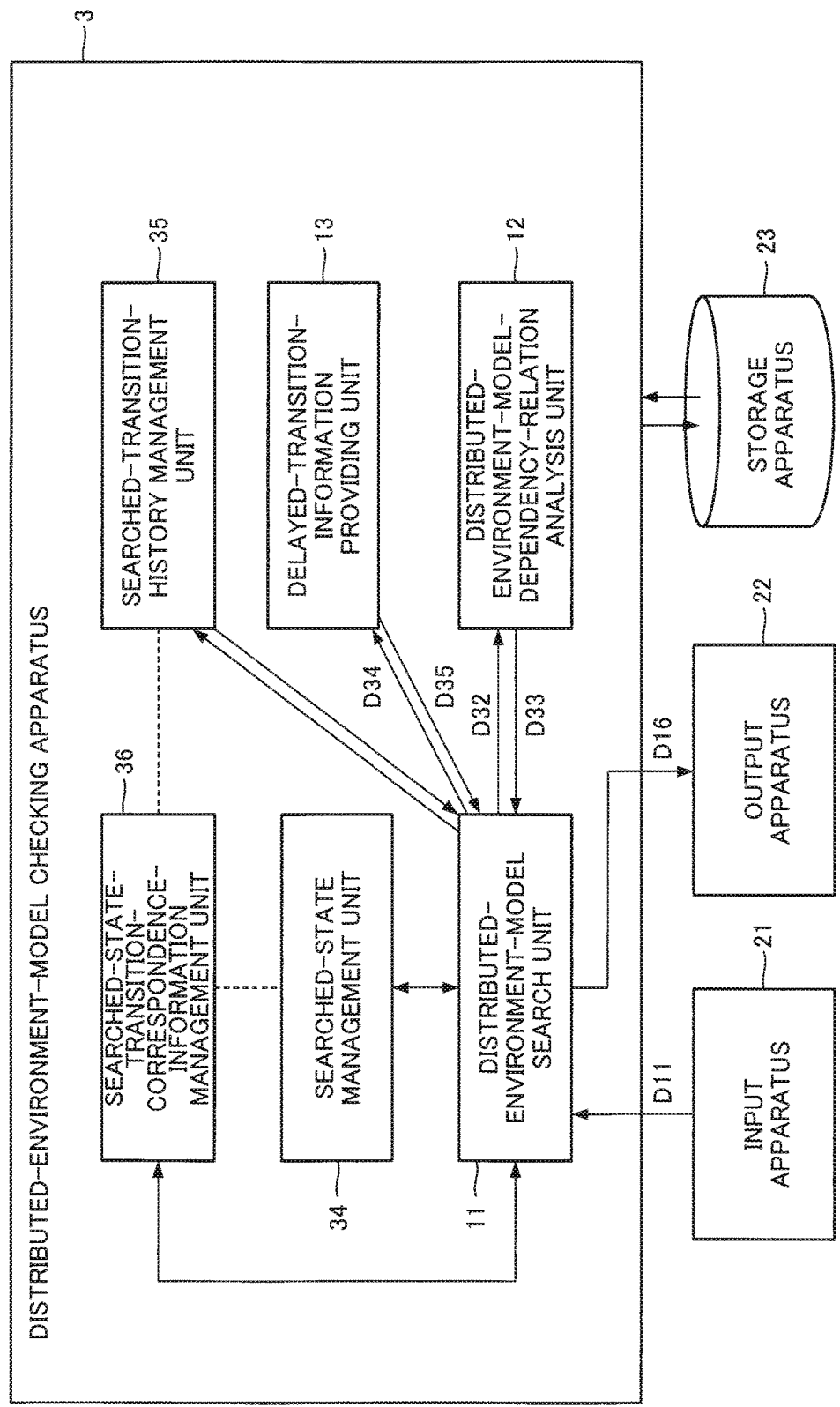
FIG. 13 is a diagram illustrating an example of a configuration according to a third exemplary embodiment of the present invention.

Next, the third exemplary embodiment of the present invention will be described in detail with reference to the drawings. A part similar to the aforementioned first exemplary embodiment will be omitted, and a point of difference will be mainly described below. In a search by model checking, the third exemplary embodiment stores and manages a searched state, and stores and manages a searched transition for each path, by use of a graph (such as a directed graph) representing contents of transitions executed in the search and an order thereof as a history. With reference to FIG. 13, a configuration according to the third exemplary embodiment of the present invention will be described in detail.

With reference to FIG. 13, a distributed-environment-model checking apparatus 3 according to the third exemplary embodiment of the present invention includes a distributed-environment-model search unit 11, a distributed-environment-model-dependency-relation analysis unit 12, a delayed-transition-information providing unit 13, a searched-state management unit 34, a searched-transition-history management unit 35, and a searched-state-transition-correspondence-information management unit 36. The distributed-environment-model search unit 11 is configured to exchange information with each of the distributed-environment-model-dependency-relation analysis unit 12, the delayed-transition-information providing unit 13, the searched-state management unit 34, the searched-transition-history management unit 35, and the searched-state-transition-correspondence-information management unit 36. An operation of the distributed-environment-model checking apparatus 3 can be provided using hardware, by mounting a circuit part being a hardware part such as a large scale integration (LSI). Alternatively, a function of the apparatus may be provided using software, by storing a program providing the function in an unillustrated software storage medium, loading the program into a main memory unit, and executing the program on a CPU.

In order to associate a searched state stored and managed by the searched-state management unit 34 with a transition stored and managed by the searched-transition-history management unit 35, the searched-state-transition-correspondence-information management unit 36 manages the correspondence relation.

The distributed-environment-model-dependency-relation analysis unit 12 receives execution-path information D32 including
a first-half execution path and
a second-half execution path
from the distributed-environment-model search unit 11. The distributed-environment-model-dependency-relation analysis unit 12 analyzes a dependency relation and a happens-before relation between two transitions on an execution path generated by combining the first-half execution path with the second-half execution path, and generates a backtrack point on the first-half execution path. The distributed-environment-model-dependency-relation analysis unit 12 returns the result D33 (a first-half execution path on which the backtrack point is generated) to the distributed-environment-model search unit 11.

A data structure of the execution-path information D32 will be described. The first-half execution path included in the execution-path information D32 is an array (or an equivalent data structure) having six execution-path components (st, tr, Backtrack, Done, Delay, Dependency) as components.

st represents a state of the distributed-environment model at a certain point.

tr represents a transition executed from the state st.

Backtrack represents a set of transitions to be executed from the state st upon backtracking, in backtracking in a search by model checking.

Done represents a set of transitions executed from the state st in past searches.

Delay represents a set of transitions, execution of which is to be postponed in a search after the state st (=delayed transitions). A difference set generated by subtracting Done from Backtrack represents a set of transitions to be executed by backtracking from the state st but not yet executed.

Dependency is a hash table (or an equivalent data structure) storing a transition confirmed to have a dependency relation by the distributed-environment-model-dependency-relation analysis unit 12. A key is a transition, and a value is a set of transitions in a dependency relation with the transition.

Adding a transition tr2 to a transition set tr_set that can be acquired by use of Dependency with a transition tr1 as a key is herein referred to as "registering tr2 with Dependency with tr1 as a key." When there is no value that can be acquired by use of Dependency with tr1 as a key, {tr2} (a set having tr2 as a component) is set as a value corresponding to the key tr1. The second-half execution path included in the execution-path information D32 is an array (or an equivalent data structure) of transitions.

An expression "a transition in an execution-path component" refers to
tr in a case of a component in the first-half execution path and
the component itself (=transition) in a case of a component in the second-half execution path.

The number of the first-half execution path included in the execution-path information D32 shall be one. By contrast, there may be a plurality of second-half execution paths or none.

A component in the second-half execution path corresponds to, as described later, a path set under a situation that, when reaching a searched state during a search by the distributed-environment-model search unit 11, history information about transitions executed from the searched state is acquired from the searched-transition-history management unit 35, and it is simulatively assumed that transitions similar to the history information are executed after the reached state.

A data structure of the first-half execution path D33 is similar to the data structure of the first-half execution path included in the aforementioned execution-path information D32.

When receiving a first-half execution path D34 from the distributed-environment-model search unit 11, the delayed-transition-information providing unit 13 provides information about a transition, execution of which is to be postponed in a subsequent search executed by the distributed-environment-model search unit 11, for the first-half execution path D34, and returns the result (first-half execution path D35) to the distributed-environment-model search unit 11.

Data structures of the first-half execution paths D34 and D35 are similar to the data structure of the first-half execution path included in the aforementioned execution-path information D32.

The searched-state management unit 34 receives a searched state from the distributed-environment-model search unit 11, and saves (stores) the state. A method of saving the state may be
saving (storing) a state as is, or
saving (storing) a state applied with some conversion (such as compression for storage capacity reduction or the like).

When accepting an inquiry about whether or not a state to be searched is a state searched in the past, from the distributed-environment-model search unit 11, the searched-state management unit 34 searches whether or not any of states stored in the searched-state management unit 34 matches the state. The searched-state management unit 34 returns a reply to the distributed-environment-model search unit 11 as follows:
"searched" when a match with the state exists, and
"unsearched" when a match with the state does not exist.

The searched-transition-history management unit 35 receives a searched transition from the distributed-environment-model search unit 11 and saves the transition by a graph structure described below.

Every node in a graph represents a transition. A directed edge is drawn between nodes. A directed edge indicates an execution order of a transition on a specific execution path in the distributed-environment model. Exceptionally, a special node called a root node represents a starting point of an execution path instead of a transition.

A directed edge is drawn from the root node to a node representing a transition executed from the initial state of the distributed-environment model.

In SDPOR, with regard to transitions tr executed on execution paths different from one another, there is always one node representing the transitions tr in a graph to be managed. By contrast, the searched-transition-history management unit 35 according to the third exemplary embodiment of the present invention creates different nodes individually for execution paths, with regard to transitions tr executed on execution paths different from one another, and represents the transitions tr on their respective execution paths individually.

The third exemplary embodiment of the present invention is different from SDPOR in that, by employing such a graph structure, a transition is saved in such a manner that a transition sequence executed on a specific execution path can be acquired by tracing a directed edge from the root node.

SDPOR does not analyze a happens-before relation defined by DPOR-DS. A graph managed by SDPOR does not aim at analysis of a happens-before relation, and information required for analysis of a happens-before relation is not retained.

A graph managed in the third exemplary embodiment of the present invention is able to retain information required for analysis of a happens-before relation due to the aforementioned difference (difference from SDPOR). Accordingly, even when a happens-before relation is considered in determination of whether or not backtracking of a search is necessary, as is the case with DPOR-DS, re-searching after a searched state is not required unlike SDPOR, and a search can be discontinued. Consequently, enhanced searching efficiency is provided.

A graph is empty at a starting point of a search by the distributed-environment-model search unit 11. The graph is constructed by accepting operations of newly generating a node and a directed edge from the distributed-environment-model search unit 11.

The searched-state-transition-correspondence-information management unit 36 stores information associating a state searched by the distributed-environment-model search unit 11 in the past with a transition executed from the state. When a state is provided as an input and an inquiry about a transition executed from the state is made, by the distributed-environment-model search unit 11, the searched-state-transition-correspondence-information management unit 36 returns a node, representing a transition executed from the state and registered in the searched-transition-history management unit 35, to the distributed-environment-model search unit 11. When there are a plurality of transitions executed from the state, the unit returns all the nodes representing the transitions.

When being provided with a state and a transition as inputs, and accepting an operation of associating the state with the transition, from the distributed-environment-model search unit 11, the searched-state-transition-correspondence-information management unit 36 stores information associating the state with a node representing the transition and stored in the searched-transition-history management unit 35.

Figure 14:
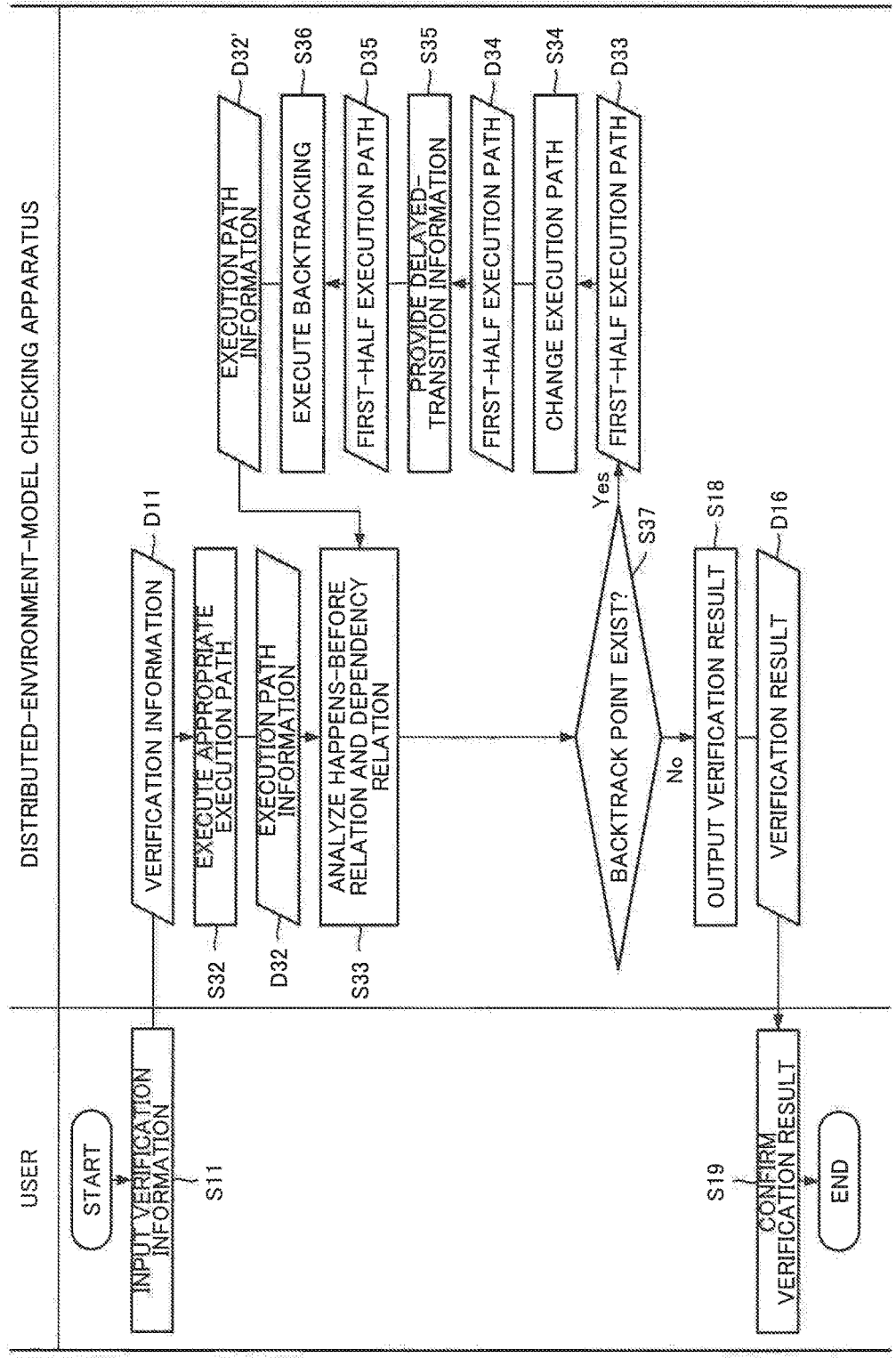
FIG. 14 is a flowchart illustrating an example of an overall operation according to the third exemplary embodiment of the present invention.

FIG. 14 is a flowchart for illustrating an overall operation according to the third exemplary embodiment of the present invention. With reference to FIGS. 13 and 14, the operation according to the third exemplary embodiment of the present invention will be described in detail.

(Step S32)

When receiving verification information D11, the distributed-environment-model search unit 11 causes a distributed-environment model included in the verification information D11 to execute a state transition, searches an appropriate path, generates execution-path information D32, and transfers the execution-path information D32 to the distributed-environment-model-dependency-relation analysis unit 12.

(Step S33)

The distributed-environment-model-dependency-relation analysis unit 12 analyzes a dependency relation and a happens-before relation on an execution path obtained by combining a first-half execution path and a second-half execution path, which are included in the execution-path information D32. The distributed-environment-model-dependency-relation analysis unit 12 generates a backtrack point on the first-half execution path, and returns the result D33 (a first-half execution path on which the backtrack point is generated) to the distributed-environment-model search unit 11.

(Step S34)

The distributed-environment-model search unit 11 specifies the deepest (rearmost) backtrack point on the first-half execution path D33, and makes a change to the first-half execution path D33, on the basis of the backtrack point. The distributed-environment-model search unit 11 transfers a first-half execution path D34 with the change, to the delayed-transition-information providing unit 13.

(Step S35)

The delayed-transition-information providing unit 13 analyzes the first-half execution path D34, and provides information about a transition, execution of which is to be postponed in a subsequent search, for the first-half execution path D34. The delayed-transition-information providing unit 13 returns a first-half execution path D35 provided with the information, to the distributed-environment-model search unit 11.

(Step S36)

The distributed-environment-model search unit 11 causes the distributed-environment model to execute a state transition again from the deepest backtrack point on the first-half execution path D35 (backtracking execution), and obtains a new execution-path information D32'. The distributed-environment-model search unit 11 transfers the new execution-path information D32' to the distributed-environment-model-dependency-relation analysis unit 12.

(Step S37)

The distributed-environment-model search unit 11 determines whether or not a backtrack point exists on the first-half execution path included in the execution-path information D32. When a backtrack point exists on the first-half execution path included in the execution-path information D32 ("Yes" branch in Step S37), the distributed-environment-model search unit 11 repeats the procedure in Steps S34 to 36. When a backtrack point no longer exists on the first-half execution path included in the path information D32 ("No" branch in Step S37), the distributed-environment-model search unit 11 outputs a model verification result.

(Details of Step S32 in FIG. 14)

Figure 15:
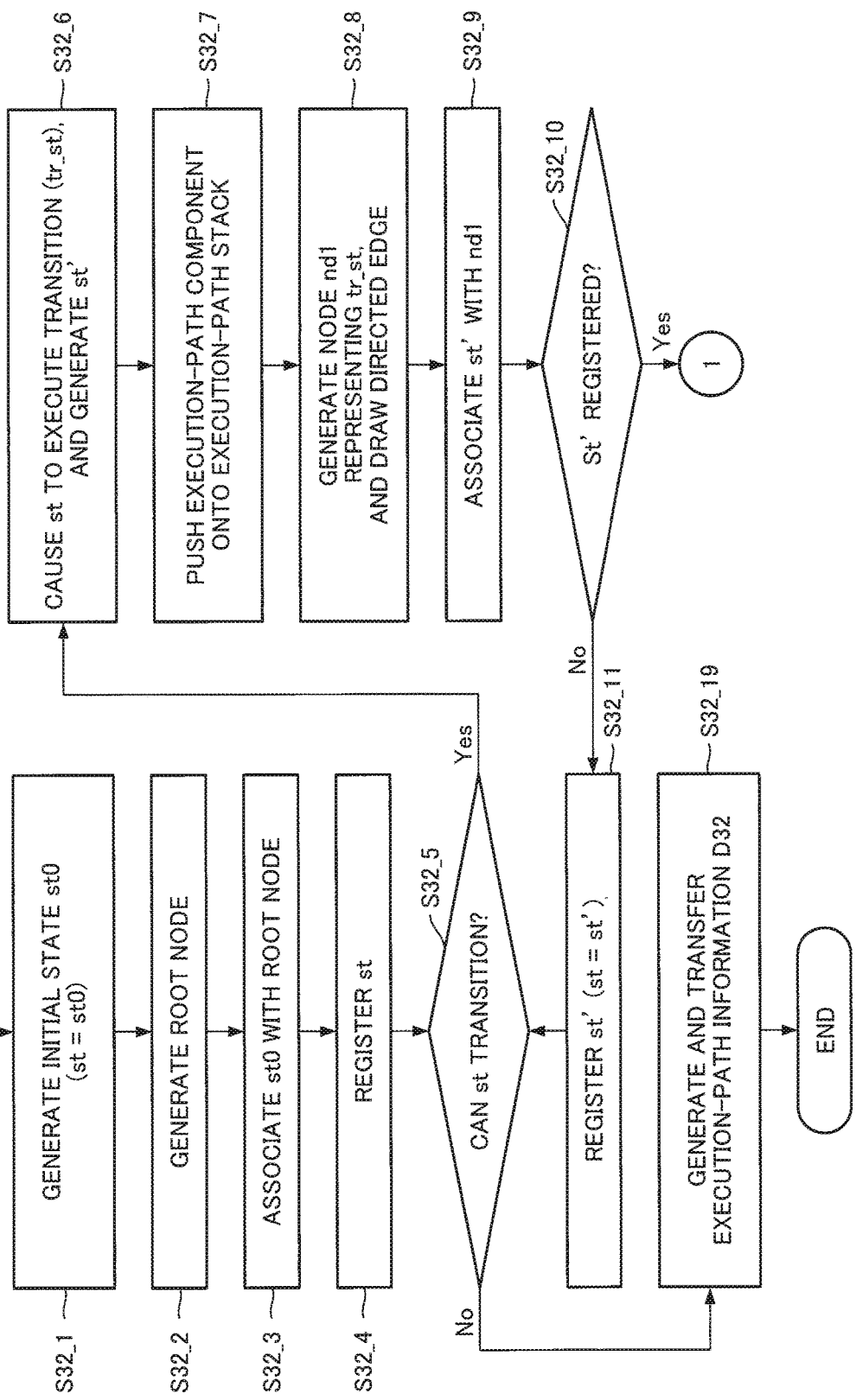
FIG. 15 is a flowchart illustrating an example of details of an operation in Step S32 in FIG. 14.
Figure 16:
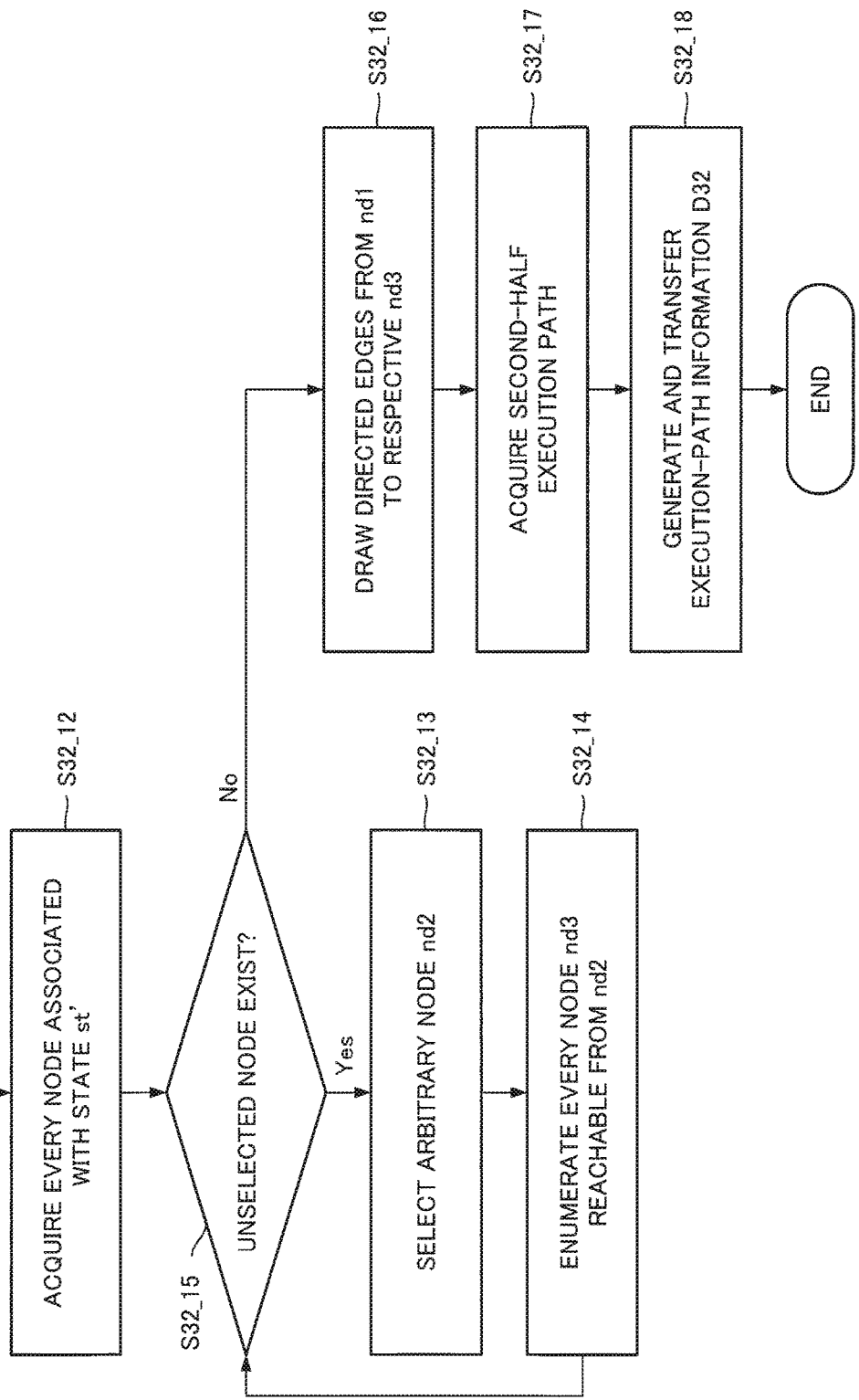
FIG. 16 is a flowchart illustrating an example of details of an operation in Step S32 in FIG. 14.

FIGS. 15 and 16 are diagrams illustrating details of the operation in Step S32 in FIG. 14. With reference to FIGS. 13, 15, and 16, Step S32 will be described more in detail.

(Step S32_1)

The distributed-environment-model search unit 11 extracts a distributed-environment model from verification information D11, generates an initial state st0 thereof, and sets a state st=st0.

(Step S32_2)

Next, the distributed-environment-model search unit 11 generates a root node in a graph managed by the searched-transition-history management unit 35.

(Step S32_3)

Additionally, the distributed-environment-model search unit 11 causes the searched-state-transition-correspondence-information management unit 36 to associate the initial state st0 with the root node.

(Step S32_4)

Next, the distributed-environment-model search unit 11 registers the initial state st0 with the searched-state management unit 34.

(Step S32_5)

Next, the distributed-environment-model search unit 11 checks whether one or more transitions executable by the state st exist.

(Step S32_6)

When one or more transitions executable by the state st exist (st can transition: "Yes" branch in Step S32_5), the distributed-environment-model search unit 11 calculates Delay', by removing each transition included in a transition set tr_set that can be acquired by use of Dependency in an execution-path component e1 at the top of an execution-path stack with a transition tr_e1 included in the execution-path component e1 as a key, and the transition tr_e1, from Delay in the execution-path component e1 (removing the transition tr_e1 from a difference set between Delay in the execution-path component e1 and tr_set). Then, the distributed-environment-model search unit 11 selects a transition tr_st not included in Delay', out of transitions executable by the state st, causes the state st to execute the transition tr_st, and generates a next state st'.

When the execution-path stack is empty (=execution-path component e1 does not exist), the distributed-environment-model search unit 11 sets Delay' to { } (empty set), and selects an arbitrary transition tr_st out of transitions executable from the state st.

When a transition not included in the Delay' (a set obtained by removing the transition tr_e1 from a difference set between Delay in the execution-path component e1 and tr_set) does not exist in transitions executable from the state st, the distributed-environment-model search unit 11 also selects an arbitrary transition tr_s out of transitions executable from the state st, causes the state st to execute the transition tr_st, and generates a next state st'. The above describes the processing in Step S32_6.

(Step S32_7)

Next, the distributed-environment-model search unit 11 generates a new execution-path component e2=(st, tr_st, { }, {tr_st}, Delay, Dependency), and pushes the component onto the execution-path stack. A content of Delay in the new execution-path component e2 is Delay' calculated in Step S32_6. A content of Dependency in the new execution-path component e2 is obtained by removing a pair of the transition tr_e1 and the transition set tr_set from Dependency in the execution-path component e1.

(Step S32_8)

Next, the distributed-environment-model search unit 11 generates a node nd1 representing the transition tr_st in the graph managed by the searched-transition-history management unit 35, and draws a directed edge from a node representing the transition executed immediately before the transition tr_st (the root node when tr_st is a transition from the initial state) to the node nd1.

(Step S32_9)

Next, the distributed-environment-model search unit 11 causes the searched-state-transition-correspondence-information management unit 36 to associate the state st' with the node nd1.

(Step S32_10)

Additionally, the distributed-environment-model search unit 11 checks whether or not the state st' is registered with the searched-state management unit 34.

(Step S32_11)

When the state st' is determined to be unregistered in Step S32_10 ("No" branch in Step S32_10 in FIG. 15), the distributed-environment-model search unit 11 registers the state st' with the searched-state management unit 34. Subsequently, the unit returns to Step S32_5 (setting st=st' upon return).

(Step S32_19)

In the determination of transition possibility in Step S32_5 in FIG. 15, when there is no transition executable from the state st ("No" branch in Step S32_5 in FIG. 15), the distributed-environment-model search unit 11 generates an execution-path information D32 being an execution path in which a content of the execution-path stack at that point is a first-half execution path, and a second-half execution path is empty, transfers the path to the distributed-environment-model-dependency-relation analysis unit 12, and ends Step S32.

(Step S32_12 in FIG. 16)

When the state st' is registered in Step S32_10 in FIG. 15 ("Yes" branch in Step S32_10), first, the searched-state-transition-correspondence-information management unit 36 acquires every node associated with the state st'.

(Step S32_15 in FIG. 16)

The distributed-environment-model search unit 11 determines whether or not an unselected node exists. When an unselected node exists ("Yes" branch in Step S32_15 in FIG. 16), the unit repeats Steps S32_13 and S32_14 until all the nodes are selected in Step S32_13.

(Step S32_13 in FIG. 16)

The distributed-environment-model search unit 11 selects an arbitrary node nd2 out of nodes associated with the state st'.

(Step S32_14 in FIG. 16)

The distributed-environment-model search unit 11 enumerates every node nd3 reachable from the node nd2 by tracing only one directed edge, in the graph managed by the searched-transition-history management unit 35.

(Step S32_16 in FIG. 16)

When it is determined that an unselected node does not exist in Step S32_15 in FIG. 16, the distributed-environment-model search unit 11 draws a directed edge from the node nd1 generated in Step S32_8 in FIG. 15 to each of the nodes nd3 enumerated in Step S32_14 in FIG. 16.

(Step S32_17 in FIG. 16)

Next, the distributed-environment-model search unit 11 sets the state st' to a starting state, and acquires a second-half execution path.

(Step S32_18 in FIG. 16)

Finally, the distributed-environment-model search unit 11 generates execution-path information D32 in which a content of the execution-path stack at that point is a first-half execution path, and the path acquired in Step S32_17 in FIG. 16 is a second-half execution path, transfers the information to the distributed-environment-model-dependency-relation analysis unit 12, and ends Step S32.

(Details of Step S32_17 in FIG. 16)

Figure 17:
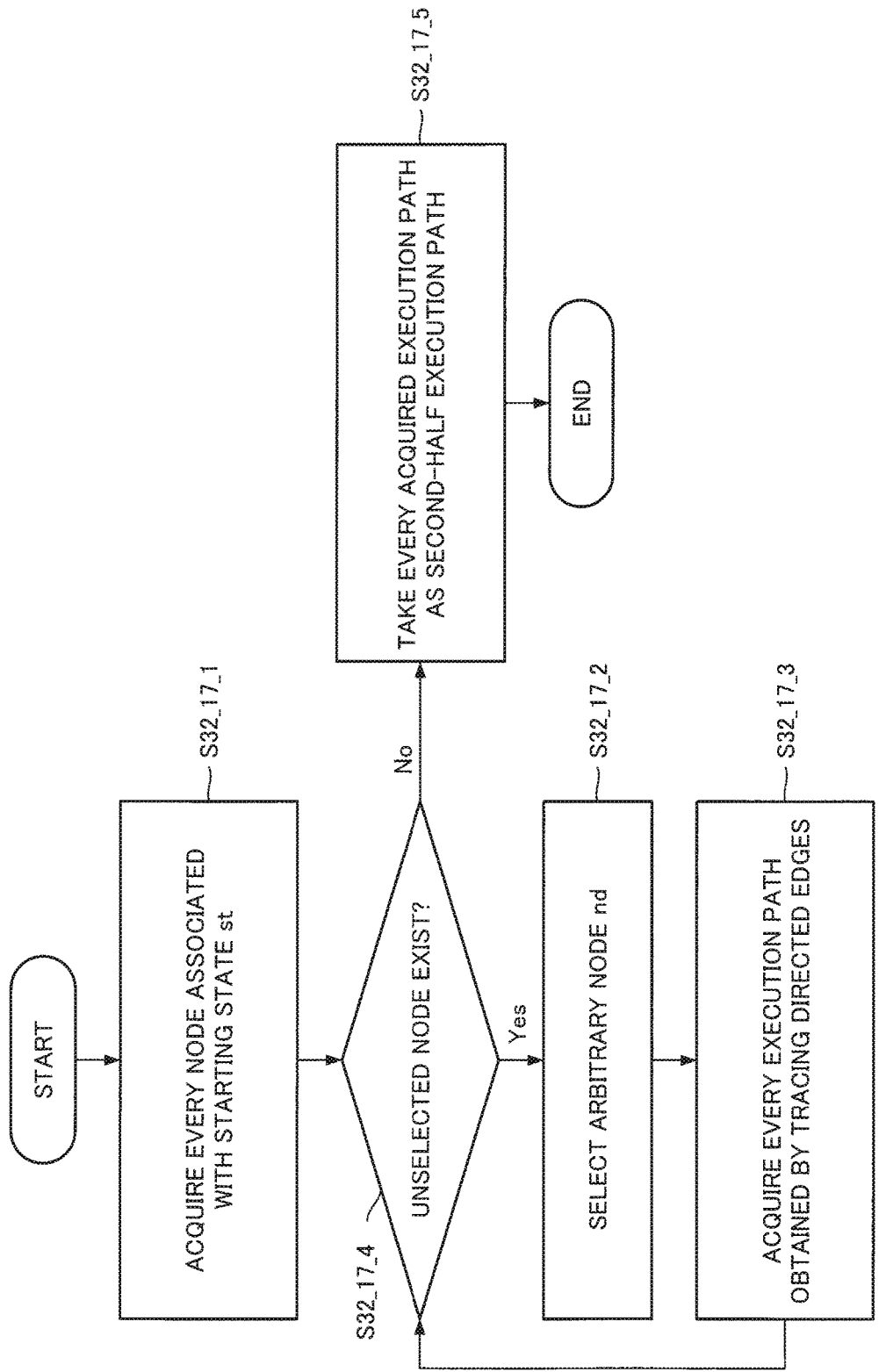
FIG. 17 is a flowchart illustrating an example of details of an operation in Step S32_17 in FIG. 16.

FIG. 17 is a diagram illustrating details of the operation in Step S32_17 in FIG. 16. With reference to FIG. 17, Step S32_17 will be described more in detail.

(Step S32_17_1)

The searched-state-transition-correspondence-information management unit 36 extracts every node associated with a starting state st.

(Step S32_17_4)

The distributed-environment-model search unit 11 repeats Steps S32_17_2 and S32_17_3 until all the nodes extracted in Step S32_17_1 are selected.

(Step S32_17_2)

Next, the distributed-environment-model search unit 11 selects an arbitrary node nd out of all nodes associated with the starting state st.

(Step S32_17_3)

The distributed-environment-model search unit 11 acquires an execution path obtained by tracing directed edges all the way from the node nd (=until a node not having a directed edge to another node is reached), in the graph managed by the searched-transition-history management unit 35.

When a branch appears midway in Step S32_17_2 (=reaching a node having a plurality of directed edges to other nodes), the distributed-environment-model search unit 11 covers every tracing pattern of the directed edges and acquires every execution path.
(Step S32_17_5)

The distributed-environment-model search unit 11 takes every execution path acquired in the aforementioned procedure as second-half execution paths, and ends Step S32_17.
(Details of Step S33 in FIG. 14)

Figure 18:
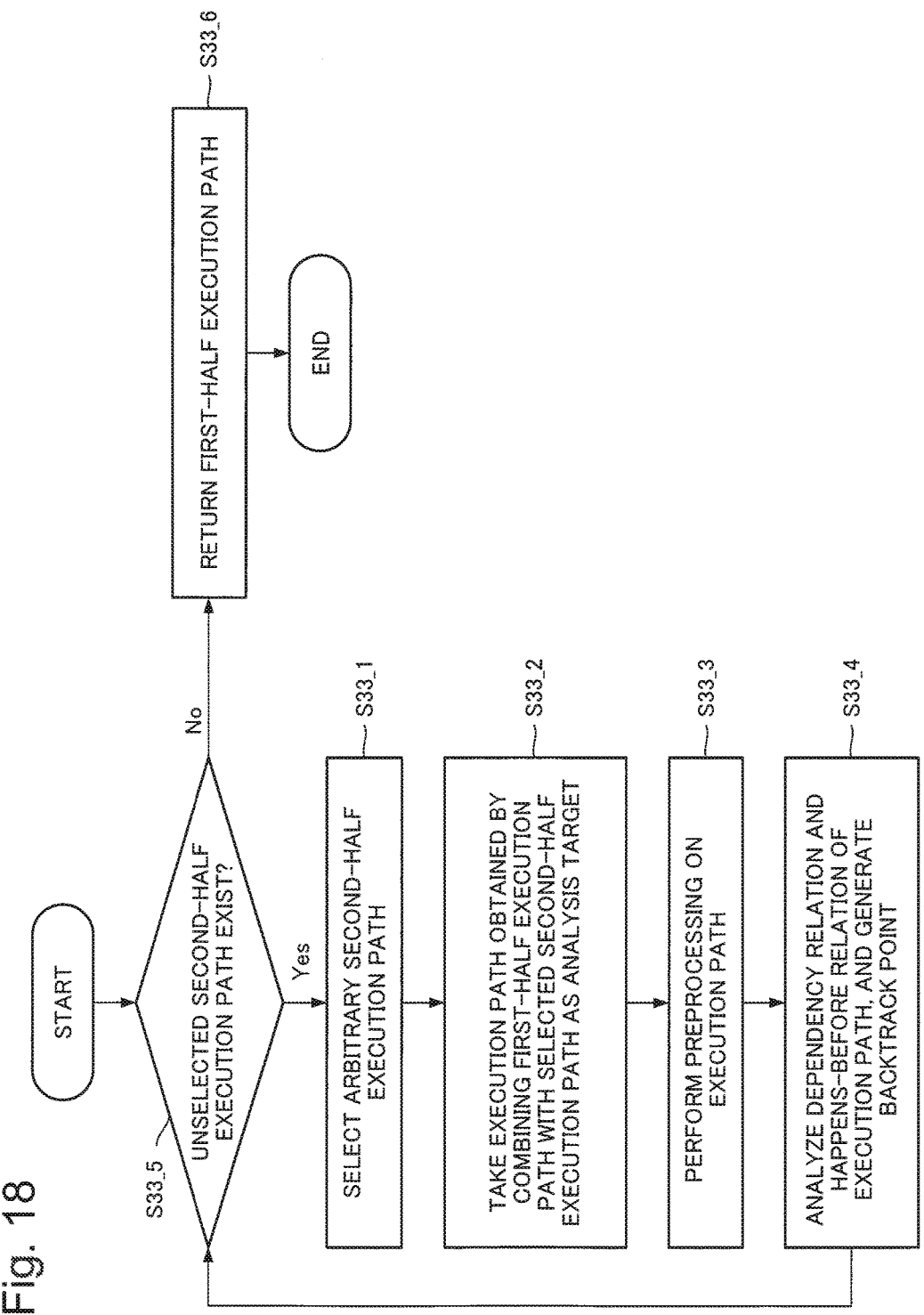
FIG. 18 is a flowchart illustrating an example of details of an operation in Step S33 in FIG. 14.

FIG. 18 is a flowchart illustrating details of the operation in Step S33 in FIG. 14. With reference to FIG. 18, Step S33 will be described more in detail.
(Step S33_1)

The distributed-environment-model-dependency-relation analysis unit 12 first selects an arbitrary path out of second-half execution paths included in the execution-path information D32.
(Step S33_2)

Next, the distributed-environment-model-dependency-relation analysis unit 12 takes an execution path obtained by combining a first-half execution path included in the execution-path information D32, with the second-half execution path selected in Step S33_1, as an analysis target.
(Step S33_3)

Next, the distributed-environment-model-dependency-relation analysis unit 12 performs preprocessing for analyzing a happens-before relation on the execution path being the analysis target.
(Step S33_4)

Additionally, the distributed-environment-model-dependency-relation analysis unit 12 analyzes a dependency relation and a happens-before relation and generates a backtrack point, on the basis of the execution path being the analysis target on which the preprocessing is performed.
(Step S33_5)

When a plurality of second-half execution paths are included in the execution-path information D32, the distributed-environment-model-dependency-relation analysis unit 12 repeats Steps S33_1 to S33_4 until all the second-half execution paths are selected in Step S33_1.
(Step S33_6)

Finally, the distributed-environment-model-dependency-relation analysis unit 12 returns a first-half execution path D33 on which the backtrack point is generated, to the distributed-environment-model search unit 11, and ends Step S33.

The operation of Step S33_3 is similar to Step 13_3 according to the aforementioned second exemplary embodiment of the present invention, and therefore description thereof is omitted.
(Details of Step S33_4 in FIG. 18)

Step S33_4 in FIG. 18 will be described more in detail with reference to FIG. 9. While the procedure flow in Step S33_4 in FIG. 18 is considered basically similar to Step S13_4 according to the aforementioned second exemplary embodiment described with reference to FIG. 9, the processing content in Step S13_4_10 in FIG. 9 is different. Accordingly, only the content of Step S13_4_10 in FIG. 9 will be described below, and description of the remaining part will be omitted.

In Step S13_4_10 according to the third exemplary embodiment of the present invention, Steps S13_4_1 to S13_4_9 are repeated until the value of i becomes greater than the length of a first-half execution path.

(Details of Step S34 in FIG. 14)

Next, Step S34 in FIG. 14 will be described more in detail with reference to FIG. 10. In the following, the execution paths D13 and D14 in FIG. 10 may be replaced with (read as) the first-half execution paths D33 and D34, respectively.
(Step S34_1)

The distributed-environment-model search unit 11 first discovers an execution-path component e1, being the rearmost of execution-path components having backtrack points (=a difference set obtained by subtracting Done from a backtrack set Backtrack is not empty) in the first-half execution path D33 acquired in Step S33, and removes a subsequent execution-path component (not including e1) from the first-half execution path D33, and takes the resulting path for a first-half execution path D34 (Step S14_1 in FIG. 10). That is, the last execution-path component in the first-half execution path D34 becomes the execution-path component e1.
(Step S34_2)

Next, the distributed-environment-model search unit 11 transfers the first-half execution path D34 to the delayed-transition-information providing unit 13 (Step S14_2 in FIG. 10).
(Details of Step S35 in FIG. 14)

Next, Step S35 in FIG. 14 will be described more in detail with reference to FIG. 11. The execution path D14 in FIG. 11 may be replaced with (read as) the first-half execution path D34 below.
(Step S35_1)

The delayed-transition-information providing unit 13 first adds a transition tr in the last execution-path component e1 in the first-half execution path D34 to Delay in e1, and takes the resulting path for a first-half execution path D35 (Step S15_1 in FIG. 11).
(Step S35_2)

Next, the delayed-transition-information providing unit 13 returns the first-half execution path D35 to the distributed-environment-model search unit 11 (Step S15_2 in FIG. 11).
(Details of Step S36 in FIG. 14)

Figure 19:
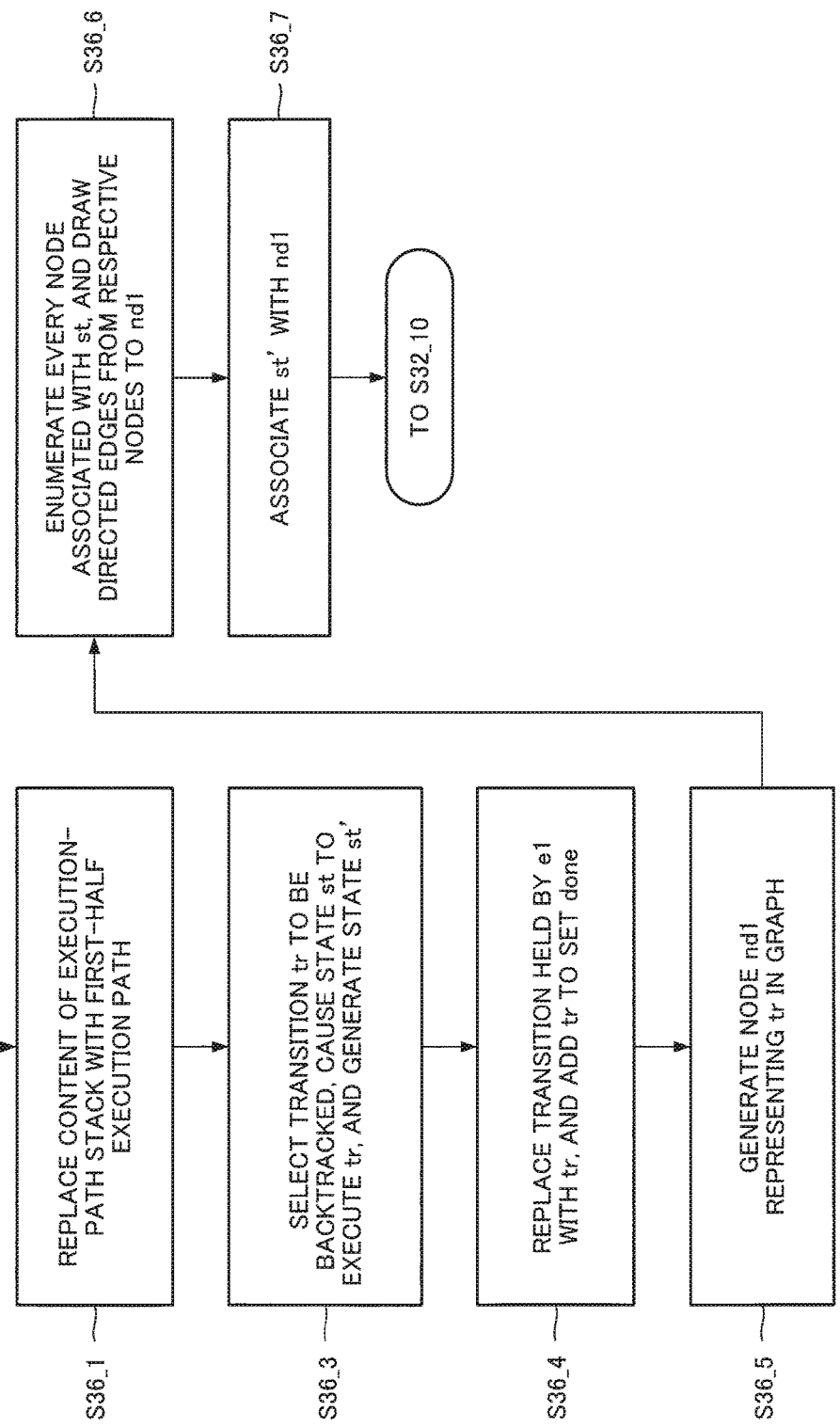
FIG. 19 is a flowchart illustrating an example of details of an operation in Step S36 in FIG. 14.

FIG. 19 is a flowchart illustrating details of the operation in Step S36 in FIG. 14. With reference to FIG. 19, Step S36 will be described more in detail.
(Step S36_1)

The distributed-environment-model search unit 11 first replaces a content of the execution-path stack with the first-half execution path D35 acquired in Step S35.
(Step S36_3)

Next, the distributed-environment-model search unit 11 selects, in the last execution-path component e1 in the execution-path stack, an arbitrary transition tr included in a backtrack set Backtrack but not included in Done, causes a state st included in the execution-path component e1 to execute the transition tr, and generates a next state st'.
(Step S36_4)

Additionally, the distributed-environment-model search unit 11 replaces the transition included in the execution-path component e1 with tr, and adds the transition tr to Done.
(Step S36_5)

Next, the distributed-environment-model search unit 11 generates a node nd1 representing the transition tr in the graph managed by the searched-transition-history management unit 35.
(Step S36_6)

Next, the searched-state-transition-correspondence-information management unit 36 enumerates every node associated with the state st, and directed edges from the nodes to nd1 are drawn in the graph managed by the searched-transition-history management unit 35.

(Step S36_7)

Furthermore, the distributed-environment-model search unit 11 causes the searched-state-transition-correspondence-information management unit 36 to associate the state st' with the node nd1.

Subsequently, the distributed-environment-model search unit 11 proceeds to Step S32_10, and the remaining procedure is similar to the description in Step S32, and therefore description thereof is omitted.

An effect according to the third exemplary embodiment will be described below. The distributed-environment-model checking apparatus 3 according to the third exemplary embodiment stores and manages a searched state in a search by model checking using DPOR, and stores and manages a searched transition, by use of a graph structure representing a history by which contents of transitions executed in the search and an order thereof can be acquired distinctively for each path. In managing searched states and transitions, the apparatus associates a searched state with a transition executed therefrom. When reaching a searched state during a search by model checking, since the searched state is stored and managed, being associated with history information about transitions executed from the searched state, the apparatus acquires the history information. Then, the apparatus is able to simulatively assume that transitions similar to the history information are executed after the searched state, analyze a dependency relation and a happens-before relation, generate a backtrack point, and discontinue the search.

Thus, analysis of a happens-before relation is feasible without searching after a searched state again. Accordingly, even when DPOR is applied to model checking of, for example, a distributed-environment model representing an OpenFlow network environment, the search after the searched state can be discontinued. Consequently, enhanced searching efficiency is provided.

Fourth Exemplary Embodiment

Figure 20:
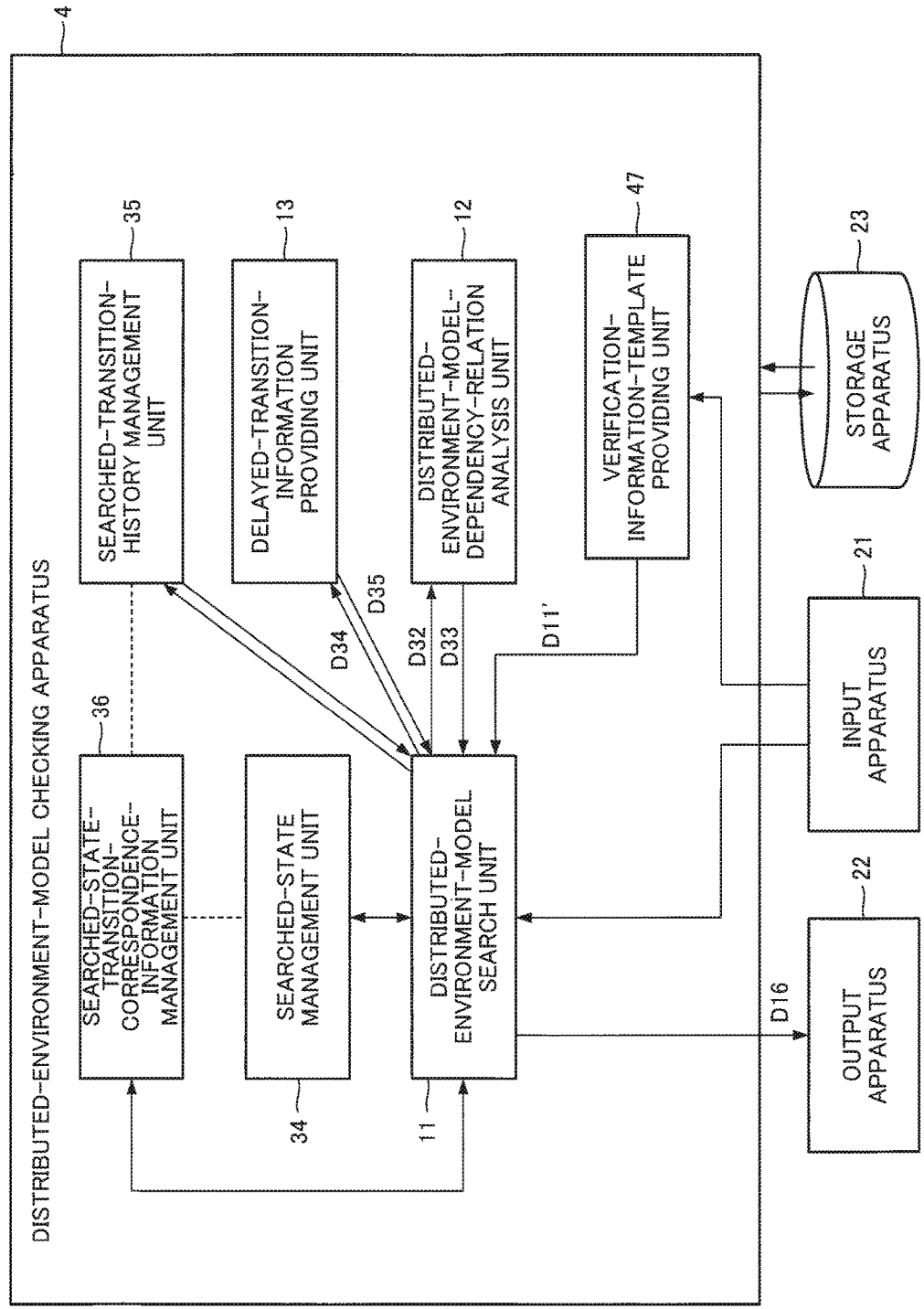
FIG. 20 is a diagram illustrating a configuration according to a fourth exemplary embodiment of the present invention.

Next, a fourth exemplary embodiment of the present invention will be described in detail with reference to the drawings. A part similar to the third exemplary embodiment will be omitted, and only a different part will be described. FIG. 20 is a diagram illustrating a configuration according to the fourth exemplary embodiment of the present invention. With reference to FIG. 20, a distributed-environment-model checking apparatus 4 according to the fourth exemplary embodiment of the present invention includes a distributed-environment-model search unit 11, a distributed-environment-model-dependency-relation analysis unit 12, a delayed-transition-information providing unit 13, a searched-state management unit 34, a searched-transition-history management unit 35, a searched-state-transition-correspondence-information management unit 36, and a verification-information-template providing unit 47. The distributed-environment-model search unit 11 is configured to exchange information with each of the distributed-environment-model-dependency-relation analysis unit 12, the delayed-transition-information providing unit 13, the searched-state management unit 34, the searched-transition-history management unit 35, the searched-state-transition-correspondence-information management unit 36, and the verification-information-template providing unit 47. In order to associate a searched state managed by the searched-state management unit 34 with a transition managed by the searched-transition-history management unit 35, the searched-state-transition-correspondence-information management unit 36 manages the correspondence relation. An operation of the distributed-environment-model checking apparatus 4 can be provided using hardware, by mounting a circuit part being a hardware part such as a large scale integration (LSI). Alternatively, a function of the apparatus may be provided using software, by storing a program providing the functions in an unillustrated software storage medium, loading the program into a main memory unit, and executing the program on a CPU.

When a user inputs verification information, the verification-information-template providing unit 47 provides a typical template (D11') with respect to a property included in verification information D11. Additionally, the verification-information-template providing unit 47 provides a function of allowing a user to select the template to be utilized in a definition of the property in part or in whole, and to input the property to the distributed-environment-model search unit 11.

Next an operation according to the fourth exemplary embodiment will be described. When creating verification information D11 in Step S11 in FIG. 5, a user selects several desired templates from the verification-information-template providing unit 47, completes the verification information D11 by use of the templates, and inputs the information to the distributed-environment-model search unit 11. However, the user may create the verification information D11 without using a template at all. The remaining operation is similar to the third exemplary embodiment of the present invention, and therefore is omitted.

Next, an effect according to the fourth exemplary embodiment will be described. When a user utilizes the distributed-environment-model checking apparatus according to the present invention, a load of creating the verification information D11 can be reduced, and, consequently, overall verification efficiency can be enhanced.

When constructing a distributed environment such as an OpenFlow network environment, and making a change to the environment, the present invention is suitable to be applied to a tool for verifying validity of such an environment. However, the application shall not be limited to the above.

The disclosure of each of the aforementioned NPLs is incorporated herein by reference thereto. The exemplary embodiments and the examples may be changed and adjusted within the scope of the entire disclosure (including the claims) of the present invention and on the basis of the basic technological concept thereof. Within the scope of the claims of the present invention, various disclosed elements (including each of the elements of each of the claims, each of the elements of the examples, and each of the elements of the drawings) may be combined and selected in a variety of ways. That is, it is apparent that the present invention includes various modifications and changes that may be made by a person skilled in the art on the basis of the entire disclosure including the claims, and the technological concept.

The aforementioned exemplary embodiments may be described as, but not particularly limited to, the following Supplementary Notes.

(Supplementary Note 1)

A distributed-environment-model checking apparatus, including:

a distributed-environment-model search unit that, when searching a distributed-environment model by model checking, executes the search while determining whether or not to postpone execution with respect to a predetermined transition;

a distributed-environment-model-dependency-relation analysis unit that analyzes a dependency relation and a happens-before relation with regard to a plurality of transitions on a path searched by the distributed-environment-model search unit, and generates information about backtracking with respect to the path; and a delayed-transition-information providing unit that generates information about the predetermined transition, execution of which is to be postponed in the search after backtracking executed by the distributed-environment-model search unit, based on the information generated by the distributed-environment-model-dependency-relation analysis unit and the analysis result.

(Supplementary Note 2)

The distributed-environment-model checking apparatus according to Supplementary Note 1, wherein the distributed-environment-model search unit searches a distributed-environment model representing an OpenFlow network environment, as a target of the model checking.

(Supplementary Note 3)

The distributed-environment-model checking apparatus according to Supplementary Note 1 or 2, further including:

a searched-state management unit that stores and manages a state searched by the distributed-environment-model search unit as a searched state;

a searched-transition-history management unit that, with regard to a transition on the searched path, stores and manages an execution order of the transition as a history of a searched transition, distinctively for each path; and a searched-state-transition-correspondence-information management unit that manages correspondence information between the searched state stored and retained by the searched-state management unit, and the transition retained by the searched-transition-history management unit, wherein, when searching a distributed-environment model by model checking, the distributed-environment-model search unit registers a searched state and a transition in the searched-state management unit and the searched-transition-history management unit, respectively, and causes the searched-state-transition-correspondence-information management unit to associate the registered searched state with the registered transition.

(Supplementary Note 4)

The distributed-environment-model checking apparatus according to Supplementary Note 3, wherein, when a state reached in a search in the model checking is a searched state stored and managed by the searched-state management unit, the distributed-environment-model search unit refers to the searched-state-transition-correspondence-information management unit and the searched-transition-history management unit, acquires history information about a searched transition executed from the searched state, and generates a path on which a transition similar to the history information is assumed to be executed as a transition after the searched state, and the distributed-environment-model-dependency-relation analysis unit analyzes a dependency relation and a happens-before relation of a transition, on the basis a path on which a transition similar to the history information is assumed to be executed.

(Supplementary Note 5)

The distributed-environment-model checking apparatus according to any one of Supplementary Notes 1 to 4, wherein the distributed-environment-model search unit includes a means that accepts a property to be verified by the distributed-environment-model checking apparatus.

The distributed-environment-model checking apparatus according to Supplementary Note 5, further including:

a verification-information-template providing unit that, when inputting the property, provides a typical template with regard to at least part of the property.

(Supplementary Note 7)

The distributed-environment-model checking apparatus according to any one of Supplementary Notes 1 to 6, wherein, as the predetermined transition, execution of which is to be postponed, a transition executed earlier of a pair of transitions in a dependency relation detected in a previous search, is postponed in a search after backtracking.

(Supplementary Note 8)

A distributed-environment-model checking method, including:

when searching a distributed-environment model by model checking, executing the search while determining whether or not to postpone execution with respect to a predetermined transition;

analyzing a dependency relation and a happens-before relation with regard to a plurality of transitions on a path searched, and generating information about backtracking with respect to the path; and generating information about the predetermined transition, execution of which is to be postponed in the search after backtracking of the distributed-environment-model, based on the analysis result the information generated.

(Supplementary Note 9)

The distributed-environment-model checking method according to Supplementary Note 8, further including:

storing and managing a state searched in the distributed-environment-model search as a searched state in a first storage unit;

with regard to a transition on the searched path, storing and managing, with regard to a transition on the searched path, an execution order of the transition as a history of a searched transition in a state distinctive for each path in a second storage unit; and managing correspondence information between the state searched and the transition searched in a third storage unit.

(Supplementary Note 10)

The distributed-environment-model checking method according to Supplementary Note 9, including:

referring, when a state reached in a search in the model checking of the distributed-environment-model search is a searched state stored and managed by the first storage unit, to the second storage unit and the third storage unit, acquiring history information about a searched transition executed from the searched state, generating a path on which a transition similar to the history information is assumed to be executed as a transition after the searched state, and analyzing a dependency relation and a happens-before relation of a transition, on the basis of a path on which a transition similar to the history information is assumed to be executed.

(Supplementary Note 11)

The distributed-environment-model checking method according to any one of Supplementary Note 8 or 9, including:

inputting a property to be verified.
(Supplementary Note 12)
The distributed-environment-model checking method according to Supplementary Note 8 or 9, further including:
providing a typical template with regard to at least part of the property.
(Supplementary Note 13)
The distributed-environment-model checking method according to any one of Supplementary Notes 8 to 12, including:
as the predetermined transition, execution of which is to be postponed, a transition executed earlier of a pair of transitions in a dependency relation detected in a previous search, is postponed in a search after backtracking.
(Supplementary Note 14)
A program stored therein, the program causing a computer to execute:
distributed-environment-model search processing of, when searching a distributed-environment model by model checking, executing the search while determining whether or not to postpone execution with respect to a predetermined transition;
distributed-environment-model-dependency-relation analysis processing of analyzing a dependency relation and a happens-before relation with regard to a plurality of transitions on a path searched by the distributed-environment-model search processing, and generating information about backtracking with respect to the path; and
delayed-transition-information providing processing of generating information about the predetermined transition, execution of which is to be postponed in the search after backtracking executed by the distributed-environment-model search processing, based on information generated by the distributed-environment-model-dependency-relation analysis processing and the analysis result.
(Supplementary Note 15)
The program according to Supplementary Note 14, wherein
the distributed-environment-model search processing searches a distributed-environment model representing an OpenFlow network environment, as a target of the model checking.
(Supplementary Note 16)
The program according to Supplementary Note 14 or 15, further including:
searched-state management processing of storing and managing a state searched by the distributed-environment-model search processing as a searched state;
searched-transition-history management processing of, with regard to a transition on the searched path, storing and managing an execution order of the transition as a history of a searched transition, distinctively for each path; and
searched-state-transition-correspondence-information management processing of managing correspondence information between the searched state stored and retained by the searched-state management processing, and the transition retained by the searched-transition-history management processing, wherein,
when searching a distributed-environment model by model checking, the distributed-environment-model search processing registers a searched state and a transition in the searched-state management processing and the searched-transition-history management processing, respectively, and causes the searched-state-transition-correspondence-information management processing to associate the registered searched state with the registered transition.

(Supplementary Note 17)
The program according to Supplementary Note 16, wherein,
when a state reached in a search in the model checking is a searched state stored and managed by the searched-state management processing, the distributed-environment-model search processing refers to the searched-state-transition-correspondence-information management processing and the searched-transition-history management processing, acquires history information about a searched transition executed from the searched state, and
generates a path on which a transition similar to the history information is assumed to be executed as a transition after the searched state, and
the distributed-environment-model-dependency-relation analysis processing analyzes a dependency relation and a happens-before relation of a transition, in accordance with a path on which a transition similar to the history information is assumed to be executed.
(Supplementary Note 18)
The program according to any one of Supplementary Notes 14 to 17, wherein
the distributed-environment-model search processing accepts a property to be verified.
(Supplementary Note 19)
The program according to Supplementary Note 17, further including:
verification-information-template providing processing of, when inputting the property, providing a typical template with regard to at least part of the property.
(Supplementary Note 20)
The program according to any one of Supplementary Notes 14 to 19, wherein,
as the predetermined transition, execution of which is to be postponed, a transition executed earlier of a pair of transitions in a dependency relation detected in a previous search, is postponed in a search after backtracking.

The present invention has been described with the aforementioned exemplary embodiments as exemplary examples. However, the present invention is not limited to the aforementioned exemplary embodiments. In other words, various embodiments that can be understood by a person skilled in the art may be applied to the present invention, within the scope thereof.

This application claims priority based on Japanese Patent Application No. 2014-086643 filed on Apr. 18, 2014, the disclosure of which is hereby incorporated by reference thereto in its entirety.

REFERENCE SIGNS LIST

1 Distributed-environment-model checking apparatus
11 Distributed-environment-model search unit
12 Distributed-environment-model-dependency-relation analysis unit
13 Delayed-transition-information providing unit
21 Input apparatus
22 Output apparatus
23 Storage apparatus
3 Distributed-environment-model checking apparatus
34 Searched-state management unit
35 Searched-transition-history management unit
36 Searched-state-transition-correspondence-information management unit
4 Distributed-environment-model checking apparatus
47 Verification-information-template providing unit

What is claimed is:

1. A distributed-environment-model checking apparatus, comprising:
a memory that stores a set of instructions; and
at least one processor configured to execute the set of instructions to:
execute, when searching a distributed-environment model by model checking, the search while determining whether or not to postpone execution with respect to a predetermined transition;
analyze a dependency relation and a happens-before relation with regard to a plurality of transitions on a path searched, and generate information about backtracking with respect to the path; and
generate information about the predetermined transition, execution of which is to be postponed in the search after backtracking executed, based on at least the information generated.

2. The distributed-environment-model checking apparatus according to claim 1, wherein
the at least one processor is configured to:
search a distributed-environment model representing an OpenFlow network environment, as a target of the model checking.

3. The distributed-environment-model checking apparatus according to claim 1, wherein
the at least one processor is configured to:
store and manage states searched as searched states;
store and manage, with regard to transitions on the searched path, execution orders of the transitions as a history of searched transitions, distinctively for each path; and
manage correspondence information between the searched state stored and retained, and the transition retained,
register, when searching a distributed-environment model by model checking, searched states and transitions in the history, and associate the registered searched states with the registered transitions.

4. The distributed-environment-model checking apparatus according to claim 3, wherein,
the at least one processor is configured to:
acquire, when a state reached in a search in the model checking is a searched state stored and managed, history information about searched transitions executed from the searched state; and
generate a path on which transitions similar to the history information is assumed to be executed as transitions after the searched state; and
analyze a dependency relation and a happens-before relation of transitions, based on with a path on which transitions similar to the history information are assumed to be executed.

5. The distributed-environment-model checking apparatus according to claim 1, wherein
the at least one processor is configured to:
accept a property to be verified by the distributed-environment-model checking apparatus.

6. The distributed-environment-model checking apparatus according to claim 5, further comprising:
the at least one processor is configured to:
provide, when inputting the property, a typical template with regard to at least part of the property.

7. A distributed-environment-model checking method, comprising:
when searching a distributed-environment model by model checking,
executing the search while determining whether or not to postpone execution with respect to a predetermined transition;
analyzing a dependency relation and a happens-before relation with regard to a plurality of transitions on the searched path, and generating information about backtracking with respect to the path; and
generating information about the predetermined transition, execution of which is to be postponed in searching the distributed-environment model after backtracking, based on at least the generated information.

8. The distributed-environment-model checking method according to claim 7, further comprising:
storing and managing, by first storage, states searched in model checking of the distributed-environment model as searched states;
with regard to transitions on the searched path, storing and managing, by second storage, execution orders of the transitions as a history of searched transitions, distinctively for each path;
storing and managing, by third storage, correspondence information between the searched states and the searched transitions;
when a state reached by a search in model checking of the distributed-environment model is the searched state stored and managed by the first storage, acquiring history information about searched transitions executed from the searched state, with reference to the second and third storage;
generating a path on which transitions similar to the history information are assumed to be executed as transitions after the searched state; and
analyzing a dependency relation and a happens-before relation of transitions, based on a path on which transitions similar to the history information are assumed to be executed.

9. The distributed-environment-model checking method according to claim 7, wherein
a property to be verified is input, or
a typical template with regard to at least part of the property is provided.

10. A non-transitory storage medium having a program stored therein, the program causing a computer to execute:
distributed-environment-model search processing of, when searching a distributed-environment model by model checking, executing the search while determining whether or not to postpone execution with respect to a predetermined transition;
distributed-environment-model-dependency-relation analysis processing of analyzing a dependency relation and a happens-before relation with regard to a plurality of transitions on a path searched by the distributed-environment-model search processing, and generating information about backtracking with respect to the path; and
delayed-transition-information providing processing of generating information about the predetermined transition, execution of which is to be postponed in the search after backtracking executed by the distributed-environment-model search processing, based on at least information generated by the distributed-environment-model-dependency-relation analysis processing.

* * * * *